United States Patent
Robles et al.

(10) Patent No.: US 11,287,274 B1
(45) Date of Patent: Mar. 29, 2022

(54) SYSTEMS AND METHODS TO IMPROVE MEMORY MANAGEMENT FOR ROUTE OPTIMIZATION ALGORITHMS

(71) Applicant: iMercatus Holdings LLC, Dallas, TX (US)

(72) Inventors: Jose Mejia Robles, Ocala, FL (US); Scott L. Gowdish, Irving, TX (US)

(73) Assignee: IMERCATUS HOLDINGS LLC, Dallas, TX (US)

( * ) Notice: Subject to any disclaimer, the term of this patent is extended or adjusted under 35 U.S.C. 154(b) by 0 days.

(21) Appl. No.: 17/380,517

(22) Filed: Jul. 20, 2021

(51) Int. Cl.
 *G01C 21/34* (2006.01)
 *G01C 21/36* (2006.01)

(52) U.S. Cl.
 CPC ..... *G01C 21/3476* (2013.01); *G01C 21/3644* (2013.01); *G01C 21/3691* (2013.01)

(58) Field of Classification Search
 CPC ............ G01C 21/3691; G01C 21/3476; G01C 21/3644
 See application file for complete search history.

(56) References Cited

U.S. PATENT DOCUMENTS

| | | | | |
|---|---|---|---|---|
| 6,098,153 | A * | 8/2000 | Fuld | G06F 12/0862 711/134 |
| 10,222,222 | B2 * | 3/2019 | Stankoulov | B60W 40/1005 |
| 2002/0103599 | A1 * | 8/2002 | Sugiyama | G01C 21/3453 701/426 |
| 2007/0156964 | A1 * | 7/2007 | Sistla | G06F 12/121 711/E12.07 |
| 2010/0036606 | A1 | 2/2010 | Jones | |
| 2011/0219208 | A1 * | 9/2011 | Asaad | G06F 9/06 712/12 |
| 2012/0317121 | A1 * | 12/2012 | Fuchs | G06F 16/9024 707/E17.014 |

(Continued)

FOREIGN PATENT DOCUMENTS

| | | | | |
|---|---|---|---|---|
| EP | 3644014 A1 * | 4/2020 | | B63B 79/15 |
| WO | WO-2020257364 A1 * | 12/2020 | | G01C 21/16 |
| WO | WO-2021042051 A * | 3/2021 | | G01C 21/1652 |

OTHER PUBLICATIONS

International Search Report and the Written Opinion of the International Searching Authority dated Oct. 20, 2021 issued in counterpart PCT Application No. PCT/US21/42404.

*Primary Examiner* — Luis A Martinez Borrero

(57) ABSTRACT

Technologies are provided for memory management for route optimization algorithms. An example method can include determining a cost surface of a route-based project associated with an area, the cost surface including nodes comprising costs associated with respective locations within the area; determining whether a cache has data of each neighbor of a current node being processed to determine a least-cost path from a start node to an end node; obtaining, from the memory cache, the data of each neighbor; for each particular neighbor that is not a boundary node in the cost surface, determining a projected cost of the particular neighbor based on an accumulated cost of the particular neighbor and an additional cost estimated based on a distance between the particular neighbor and the end node; and based on the projected cost of each particular neighbor, determining the least-cost path from the start node to the end node.

20 Claims, 8 Drawing Sheets

(56) References Cited

U.S. PATENT DOCUMENTS

| | | | |
|---|---|---|---|
| 2014/0278038 A1* | 9/2014 | Stankoulov | G06T 11/203 |
| | | | 701/123 |
| 2016/0011996 A1* | 1/2016 | Asaad | G06F 9/3885 |
| | | | 710/308 |
| 2016/0153796 A1* | 6/2016 | Stankoulov | G01C 21/3469 |
| | | | 701/123 |
| 2017/0116564 A1 | 4/2017 | Luo | |
| 2017/0248432 A1 | 8/2017 | Kilby et al. | |
| 2017/0370738 A1* | 12/2017 | Park | G01C 21/3667 |
| 2018/0172458 A1* | 6/2018 | Yamamoto | G01C 21/3438 |
| 2020/0173790 A1* | 6/2020 | Kelleher | G01C 21/343 |
| 2020/0393567 A1* | 12/2020 | Schroeter | G06F 16/29 |

* cited by examiner

SYSTEMS AND METHODS TO IMPROVE MEMORY MANAGEMENT FOR ROUTE OPTIMIZATION ALGORITHMS

TECHNICAL FIELD

The present disclosure generally relates to memory management, and more specifically to improving memory management for route optimization algorithms.

BACKGROUND

Determining a path for a route-based project is a highly complex process. For example, when determining a path for a route-based project, it can be very difficult to harmonize the project's goals and priorities with a multitude of engineering and other factors and constraints, which can be intrinsic and/or extrinsic to the specific geography. Such factors and constraints can include, for example, geological and environmental characteristics of the targeted areas, engineering capabilities and limitations, social and political factors associated with the geography, legal and regulatory aspects of the trade, among others. In some cases, the considerations in determining a path for a route-based project can include a number of elements pertaining to the engineering process. For example, in pipeline construction projects, some considerations can include costs, time, and risks associated with a number of activities such as surveying, fencing, clearing, grading, stringing, bending, welding, coating, trenching, lowering, back-filling, etc.

Further, the design and configuration of pipeline structures can include additional challenges and complexities, such as constructing additional permanent structures and facilities like pumping and maintenance stations, for example. Moreover, in order to support the construction process, a set of logistic facilities and activities may need to be developed, which can range from movement of personnel and materials to the construction of short-lived structures like access roads, storage and housing facilities, among others. The various factors and constraints in route-based projects significantly complicate such projects and can result in a number of issues if not properly addressed. For example, overlooking one or more of these factors and constraints can result in a wide range of problems such as design and/or construction problems, cost over-runs, delays, etc.

BRIEF DESCRIPTION OF THE DRAWINGS

Illustrative embodiments of the present application are described in detail below with reference to the following figures.

DETAILED DESCRIPTION

Figure 1:
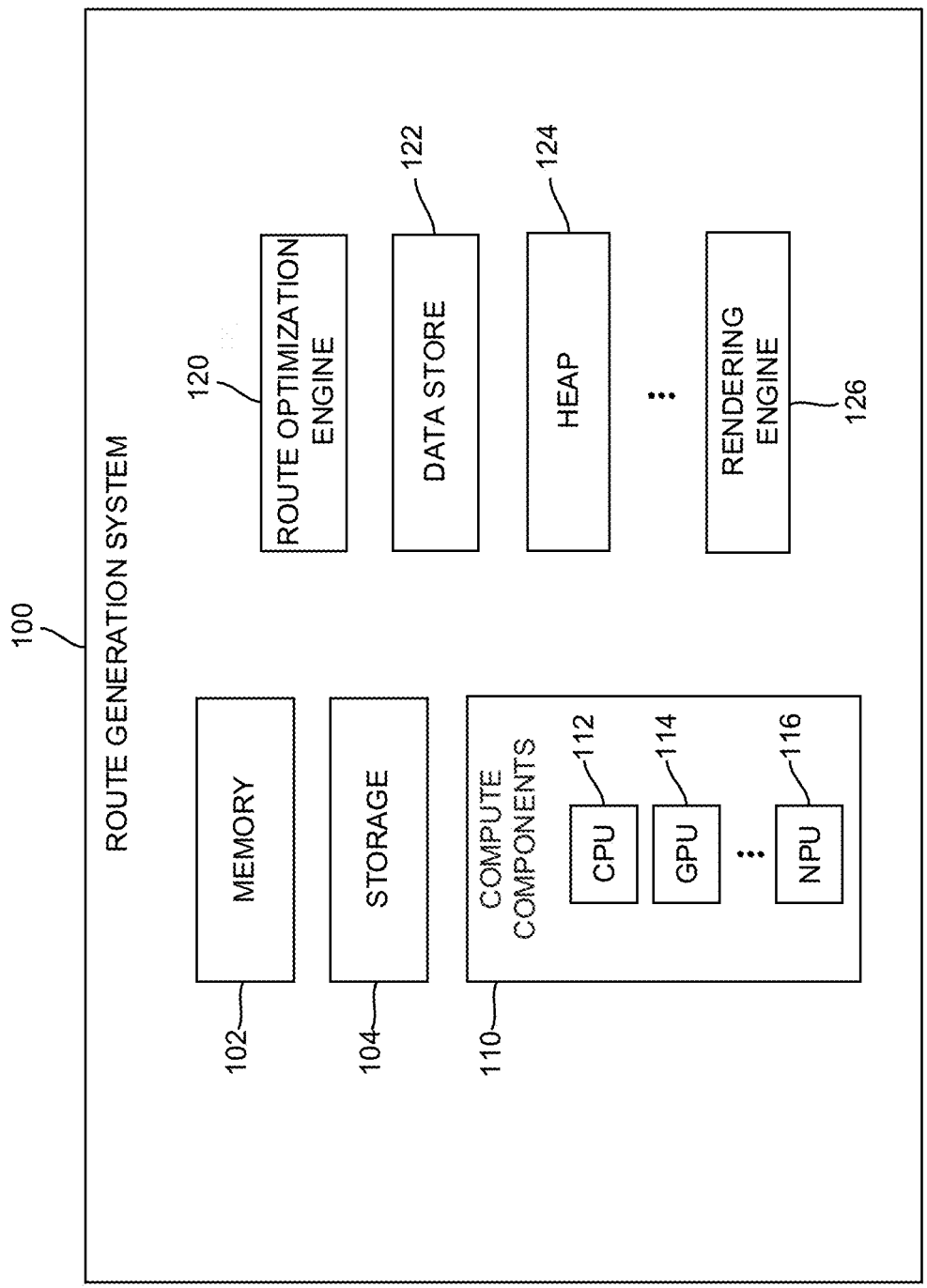
FIG. 1 is a simplified block diagram illustrating an example route generation system, in accordance with some examples of the present disclosure.

Certain aspects and embodiments of this disclosure are provided below. Some of these aspects and embodiments may be applied independently and some of them may be applied in combination as would be apparent to those of skill in the art. In the following description, for the purposes of explanation, specific details are set forth in order to provide a thorough understanding of embodiments of the application. However, it will be apparent that various embodiments may be practiced without these specific details. The figures and description are not intended to be restrictive.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the application as set forth in the appended claims.

In some aspects, systems, apparatuses, processes (also referred to as methods), and computer-readable media (collectively referred to herein as "systems and techniques") are described herein for dynamic route generation and optimization for linear and non-linear projects, and improved memory management for route optimization algorithms. As previously noted, determining an optimized path for route-based projects is a highly complex process. In some cases, the process can seek to harmonize the project's goals and priorities with a multitude of factors and constraints, which can be intrinsic and/or extrinsic to the chosen geography. In some examples, the process can account for geological and environmental characteristics of the targeted areas, engineering capabilities and limitations, social and political factors associated with the geography, legal and regulatory aspects of the trade, among others. The process can also take into account a number of factors and/or variables pertaining to the engineering process. For example, pipeline construction projects can involve an analysis of costs (e.g., risks, challenges, time, distance, resources, etc.) associated with a number of activities such as surveying, fencing, clearing, grading, stringing, bending, welding, coating, trenching, lowering, back-filling, among others. The design and configuration of pipeline structures can involve construction of additional permanent structures and facilities like pumping and maintenance stations, for example.

In some cases, to support the construction process, a set of logistic facilities and activities may be developed, which can range from movement of personnel and materials to the construction of short-lived structures such as access roads, storage and housing facilities, among others. The various factors and constraints in route-based projects can complicate such projects and can result in a number of issues if not properly addressed. For example, overlooking one or more of these example factors and constraints can result in a wide range of problems such as design and/or construction problems, cost over-runs, delays, litigations, etc.

Often, these colossal endeavors may rely heavily on human expertise due to their enormous complexities and the unique characteristics of each project. However, as further described herein, computation and route optimization algorithms can be implemented to more accurately, intelligently, and/or efficiently determine an optimized route connecting two or more locations or touching points. In some cases, to utilize a route optimization algorithm to determine an optimal route and address the various problems, challenges and/or potential pitfalls described herein, a route optimization system can translate the various goals, priorities, factors, constraints, etc., into a particular representation understandable by computers and specific route analysis algorithms, such as an A* algorithm or Dijkstra's algorithm (e.g., SMA*, etc.), for example.

In some examples, a representation generated from the various goals, priorities, factors, constraints, etc., can include a "cost surface". A cost surface can include a collection of nodes where each node is assigned one or more properties and/or costs to represent the contribution of that node in terms of cost. The cost can include, for example and without limitation, a cost(s) in terms of time, risks, complexity, monetary expenditure, distance, environmental impact, geological and/or environmental characteristics/challenges of the targeted areas, engineering capabilities and/or limitations, project requirements, and/or any other number of variables and/or constraints. A route optimization algorithm can find an optimal solution for establishing an uninterrupted sequence of nodes within the cost surface, which can connect the predefined touching points while fulfilling the specified goals, priorities, factors, constraints, etc.

In some cases, a cost surface can include and/or represent, among other things, data from one or more data sources such as standard and/or customized geographic information system (GIS) datasets. The GIS datasets can describe, for example, geological characteristics of a geographic area; roads, buildings, urban areas, protected areas, etc. The number of factors, considerations, node properties, costs, etc., can be difficult to account and can increase the computational complexity of the project, the engineering complexity of the project, etc. For example, producing a large cost surface that covers the entire territory of the United States would pose a considerable computational challenge as the properties and weights of each node may be precalculated and stored a storage destination or data structure such as a database. However, precalculating the properties and costs of each node or calculating them on demand (e.g., in real time or substantially real time) can be extremely difficult and even unpractical for most computing configurations.

For example, the U.S. state of Texas has an approximate area of 269,000 square miles, and a cost surface representing the state of Texas with a resolution of 30×30 meters, which is a typical resolution for GIS data, may include approximately 775 million nodes and associated data. As another example, a cost surface representing the entire territory of the United States (e.g., approximately 3.8 million square miles), can include approximately fifteen times the amount of nodes and associated data as the cost surface representing the state of Texas. Such large amounts of data can be difficult to process in an efficient manner while maintaining sufficient computational resources for a route optimization algorithm to perform its computationally and resource intensive operations.

In some cases, to reduce the amount of data, computational burden, and/or computer resources used for route optimization, a route optimization algorithm can reduce the searching area by predefining a 'bounding box' that encompasses touching points or nodes including starting and ending nodes. However, it can be very difficult or unlikely to ensure that such a bounding box will contain the optimal solution being searched for. Accordingly, such a route optimization process using a bounding box can essentially become a trial-and-error approach involving multiple iterations before a solution (e.g., a route/path) is identified. The multiple iterations performed can be time consuming, inefficient, and/or resource intensive. Moreover, while increasing the size of the bounding box can increase the chances of finding an optimal solution within a fewer amount of iterations, the increased size of the bounding box can in many cases counter time, resource, and/or processing benefits otherwise achieved by reducing the searching area to a predefined bounding box.

The systems and techniques described herein can allow a route optimization algorithm to limit or reduce the amount of data it loads into memory when performing route optimization operations. Moreover, the systems and techniques described herein can find an optimal route for a route-based project without relying on a predefined bounding box and/or without implementing multiple iterations (or implementing a limited/reduced number of iterations). In some examples, the systems and techniques described herein can provide a method for implementing a route optimization algorithm that can consume data from a large data source (e.g., a database, etc.) of geographically identified information without restricting the algorithm's operation to a specific bounding box. The systems and techniques described herein can increase the computational efficiency and/or reduce the computational burden in finding an optimal route/path for a route-based project.

In some examples, the systems and techniques described herein can dynamically process route optimization data and determine an optimal route, while reducing the memory and/or computational footprint of the route optimization algorithm(s). Moreover, the systems and techniques described herein can determine an optimal route for a geographic area involving larger amounts of data, and can reduce the amount of unnecessary data (e.g., unnecessary to finding an optimal route, unnecessary to generating a route optimization output, etc.) considered, processed, and/or generated by the route optimization algorithm(s).

In some cases, the systems and techniques described herein can generate optimized routes for route-based projects that involve laying down a path between two or more locations or touching points, and constructing and/or deploying a variety of infrastructure along the generated route. The path and/or infrastructure can include, for example and without limitation, pipelines, power lines, roads, railroad tracks, tunnels, buried cable, right-of-ways, and/or any other route-based infrastructure.

In some cases, the systems and techniques described herein can implement a route optimization algorithm in conjunction with a cost surface data structure, such as a cost surface database. The cost surface for a geographic area being analyzed can be represented as a collection of nodes. In some examples, each node can be identified by a specific set of coordinates corresponding to the location of the node within the cost surface and/or geographic area. Moreover, each node can contain the relevant data considered at the time of calculating the cost (e.g., weight) of using such geographic location to construct or deploy infrastructure. In some examples, each node can contain data indicating whether such geographic location can or cannot be used to construct or deploy infrastructure, which can be based on the location's current use, characteristics, and/or other relevant factors.

The cost (or weight) referenced herein can include one or more types of costs such as, for example and without limitation, costs/weights in terms of and/or related to resources, time, risks, monetary expenditure, distance, challenges (e.g., engineering/technical challenges, environmental challenges, regulatory challenges, usage challenges, geographic challenges, social challenges, etc.), environmental impact, complexity/difficulty, project requirements, performance, dangers, and/or any other magnitude, goal, and/or consideration associated with a route-based project.

An example route optimization system can be used to find the optimal route connecting touching points in a predetermined sequence while satisfying the specific criteria associated with generating the route. In some cases, the route optimization system can implement an adapted route optimization algorithm(s), as further described herein. In some examples, the adapted route optimization algorithm(s) can read the data pertaining to each node of interest from a fast memory device and/or structure containing cost surface data such as, for example, a memory cache or buffer. In some examples, the adapted route optimization algorithm(s) can signal the calling context that data at certain coordinates (e.g., X and Y coordinates in a coordinate system) is needed/requested whenever data for a specific node associated with such coordinates is needed for calculations and/or is not found and/or available on the fast memory device and/or structure.

In some examples, the fast memory device and/or structure (e.g., memory cache, buffer, etc.) can be managed in such way that when the adapted route optimization algorithm signals the calling context to indicate that data at certain coordinates is missing, a new block of data is retrieved from the cost surface data structure containing the node representing the specific coordinates. In some cases, in addition to including the node representing the specific coordinates, the new block of data retrieved can include a surplus of nodes located around (e.g., adjacent to, within a proximity to, etc.) the specific coordinates. Moreover, the shape and size (and/or radius) of the segment area retrieved can vary for different projects based on a number of factors such as, for example, project-specific factors and/or criteria.

For example, the shape and dimensions selected in a particular implementation can have an impact on the overall performance of that implementation. Therefore, the shape and/or dimensions selected can be tuned for the particular implementation based on, for example, the project considerations/factors, the user's/designer's observation and experience, and/or any other relevant factors. In some examples, using larger segments can reduce the number of fetches of data by the route optimization system and thus increase performance. In some cases, using larger segments can also result in an increase in the number of unnecessary nodes retrieved, which results in additional memory allocation and/or utilization.

The adapted route optimization algorithm(s) can recognize a specific type of node referred to as a "boundary node" herein. The boundary node can include nodes along one or more edges and/or boundaries of the cost surface, and but should not be confused with a "bounding box" predefining a reduced searching area as previously described. In some examples, the adapted route optimization algorithm(s) can recognize a boundary node and its associated function to indicate that the edge of the cost surface has been reached. The boundary nodes can be precomputed or created dynamically during the retrieval/processing of data blocks from the cost surface data structure. The adapted route optimization algorithm(s) can distinguish between conditions where a node is not in the memory and the node does not exist in the cost surface data structure, and can thus prevent a loop of requests for a node that does not exist in the cost surface data structure.

Examples of the systems and techniques described herein for determining optimized routes for route-based projects are illustrated in FIG. 1 through FIG. 7 and described below. FIG. 1 is a diagram illustrating an example route generation system 100. The route generation system 100 can implement one or more route optimization algorithms to determine optimized routes. The route generation system 100 can perform various processing tasks, computations, operations, etc., as further described herein. The route generation system 100 can also implement memory management and data processing techniques for improved memory management for algorithms, such as route optimization algorithms, as further described herein.

In the example shown in FIG. 1, the route generation system 100 includes memory 102, storage 104, computing components 110, route optimization engine 120, data store 122, and rendering engine 126. The route generation system 100 can also optionally include heap 124, as further described herein. The route generation system 100 can be part of a computing device or multiple computing devices. In some examples, the route generation system 100 can be part of an electronic device (or devices) such as a server computer, a desktop computer, a laptop or notebook computer, a tablet computer, a datacenter, a cloud computing/infrastructure node, or any other suitable electronic device(s).

In some implementations, the memory 102, the storage 104, the computing components 110, the route optimization engine 120, the data store 122, the heap 124, and the rendering engine 126 can be part of the same computing device. For example, in some cases, the memory 102, the storage 104, the computing components 110, the route optimization engine 120, the data store 122, the heap 124, and the rendering engine 126 can be implemented by a server computer, desktop computer, laptop, tablet computer, cloud computing/infrastructure node, and/or any other computing device. In other implementations, any of the memory 102, the storage 104, the computing components 110, the route optimization engine 120, the data store 122, the heap 124, and/or the rendering engine 126 can be part of two or more separate computing devices. In some cases, the route generation system 100 can be implemented by and/or using one or more virtual/logical systems such as, for example, one or more virtual machines (VMs), software containers, serverless computing functions, etc.

The memory 102 can include one or more memory devices and/or structures, and can include any type of memory such as, for example, volatile memory (e.g., RAM, DRAM, SDRAM, DDR, etc.), flash memory, flash-based memory (e.g., solid-state drive), cache memory, etc. In some examples, the memory 102 can implement and/or include cache memory and/or buffers for fast data access. For example, in some cases, the memory 102 can include a memory buffer for storing cost surface nodes as further described herein. The memory 102 can be used to store data such as, for example, cost surface nodes and associated data, signaling data, processing parameters, metadata, event data, preferences, operational state, and/or any type of data. In some examples, the memory 102 can be used to store data from and/or used by the storage 104, the computing components 110, the route optimization engine 120, the data store 122, the heap 124, and/or the rendering engine 126.

The storage 104 can be or include any storage device(s) for storing any type of data and/or data structures (e.g., databases, data stores, files, data objects, data containers, etc.). The storage 104 can store data from any of the components of the route generation system 100. For example, the storage 104 can store data (e.g., inputs, outputs, parameters, calculations, rules, preferences, objects, files, etc.) from and/or for the computing components 110, the route optimization engine 120, the data store 122, the heap 124, and/or the rendering engine 126.

In some implementations, the computing components 110 can include a central processing unit (CPU) 112, a graphics processing unit (GPU) 114, and/or a neural processing unit (NPU) 116. In some cases, the computing components 110 can include multiple processors, such as one or more CPUs, one or more GPUs, one or more NPUs, etc. In some cases, the computing components 110 can include other types of processors and/or processing devices that are not shown in FIG. 1. For example, the computing components 110 can alternatively or additionally include one or more field-programmable gate arrays (FPGAs), one or more application-specific integrated circuits (ASICs), one or more digital signal processors (DSPs), etc.

The computing components 110 can perform various operations such as determining a route for a route-based project, performing route optimization, generating route determination outputs, rendering graphical representations of objects and/or data (e.g., routes, geographic areas, maps, interfaces, etc.), modeling, tracking, computer vision, graphics rendering, memory management, machine learning, filtering, and any of the various operations described herein. In some examples, the computing components 110 can implement the route optimization engine 120, the rendering engine 126, etc. In other examples, the computing components 110 can also implement one or more other processing engines.

The operations for the route optimization engine 120 and the rendering engine 126 can be implemented by one or more of the computing components 110. In one illustrative example, the route optimization engine 120 (and associated operations) can be implemented by the CPU 112 and/or the NPU 116, and the rendering engine 126 (and associated operations) can be implemented by the GPU 114. In some cases, the computing components 110 can include other electronic circuits or hardware, computer software, firmware, or any combination thereof, to perform any of the various operations described herein.

The computing components 110 can implement the route optimization engine 120 to perform various route planning, processing and/or optimization operations. In some examples, the route optimization engine 120 can implement one or more route optimization algorithms, such as a route optimization algorithm described herein. In some cases, the route optimization engine 120 can include one or more other processing engines such as, for example, a machine learning engine, a data search engine, an analytics engine, a modeling engine, a project management tool, a planner, and/or any other processing engine, tool, and/or algorithm.

The data store 122 can store cost surface data. The cost surface data can include any available data of (and/or associated with) the cost surface described herein, such as node data. The data store 122 can provide a persistent storage for such data. For example, in some cases, the data store 122 can include a database of cost surface data. In some cases, the data store 122 can be implemented by and/or can reside in the storage 104.

In some examples, the data store 122 can provide cost surface data requested by the route generation system 100 (and/or any components thereof) and/or any cost surface data responses to data store queries. In some cases, the data store 122 can provide responses to data queries that are designed so that only nodes contained in a predefined geometry (e.g., a square, rectangle, circle, etc.) are returned. For example, the data store 122 can retrieve/provide data associated with a data query identifying one or more coordinates and/or any additional parameters indicating the configuration (e.g., the size, shape, dimension, etc.) of a geometry for which data is being and/or associated with one or more nodes being requested.

The heap 124 can be optionally implemented by the route generation system 100. The heap 124 can include a data structure that maintains a list of nodes being analyzed (also referred to as "open nodes"). In some cases, the heap 124 can maintain the list of nodes in a particular order or rank such as, for example, in ascending or descending order. The nodes can be ordered or ranked based on one or more criteria defined by the route optimization engine 120. In some examples, the criteria for ordering or ranking open nodes in the heap 124 can include a projected cost associated with the open nodes. In some cases, the projected cost can be represented as f and can be obtained by adding the values of g and h, where g is the accumulated cost obtained by backtracking from a current node to the start node, and his the estimated additional cost for reaching the end node from the current node. Thus, in some examples, the heap 124 can include a list of open nodes ranked by f=g+h.

In some cases, the value of h can be provided by a heuristic function such as, for example without limitation, the Euclidean distance between the current node and the end node. Other heuristic functions are also contemplated herein. Moreover, the content of the heap 124 can persist between calls to the route optimization engine 120 to prevent loss of the state and/or progress of the route searching process. In some examples, the heap 124 can be implemented by and/or can reside in the storage 104. In other examples, the heap 124 can be implemented by and/or can reside in the memory 102.

The rendering engine 126 can receive output data, such as graphics, results, image data, etc., from the computing components 110 and render the output data for presentation on a display device such as, for example, a screen/display, a television, a projector, a monitor, etc. In some examples, the rendering engine 126 can receive generated routes and/or associated data from the route optimization engine 120 and render the generated routes and/or associated data. In some cases, the rendering engine 126 can render a map, view, topology, and/or representation of a generated route, a cost surface, and/or a geographical area associated with the generated route and/or cost surface.

While the route generation system 100 is shown to include certain components, one of ordinary skill in the art will appreciate that the route generation system 100 can include more or fewer components than those shown in FIG. 1. For example, the route generation system 100 can also include, in some instances, one or more additional memory devices (e.g., RAM, ROM, cache, and/or the like), one or more networking interfaces (e.g., wired and/or wireless communications interfaces and the like), one or more display devices, one or more input devices, and/or other hardware or processing devices that are not shown in FIG. 1. An illustrative example of a computing device and hardware components that can be implemented with the route generation system 100 is described below with respect to FIG. 7.

Moreover, each component shown in FIG. 1 can represent one or more of such components. For example, the data store 122 shown in FIG. 1 can include a single data store or multiple data stores. As another example, the heap 124 can include a single heap or multiple heaps. As yet another example, the CPU 112 can include a single CPU (which can include one or more cores) or multiple CPUs. Thus, any component shown in FIG. 1 as a single instance of that component (e.g., in the singular) is merely for simplicity and illustration purposes. One of ordinary skill in the art will recognize that in other examples the route generation system 100 can include multiple instances of any of the components shown in FIG. 1.

Figure 2:
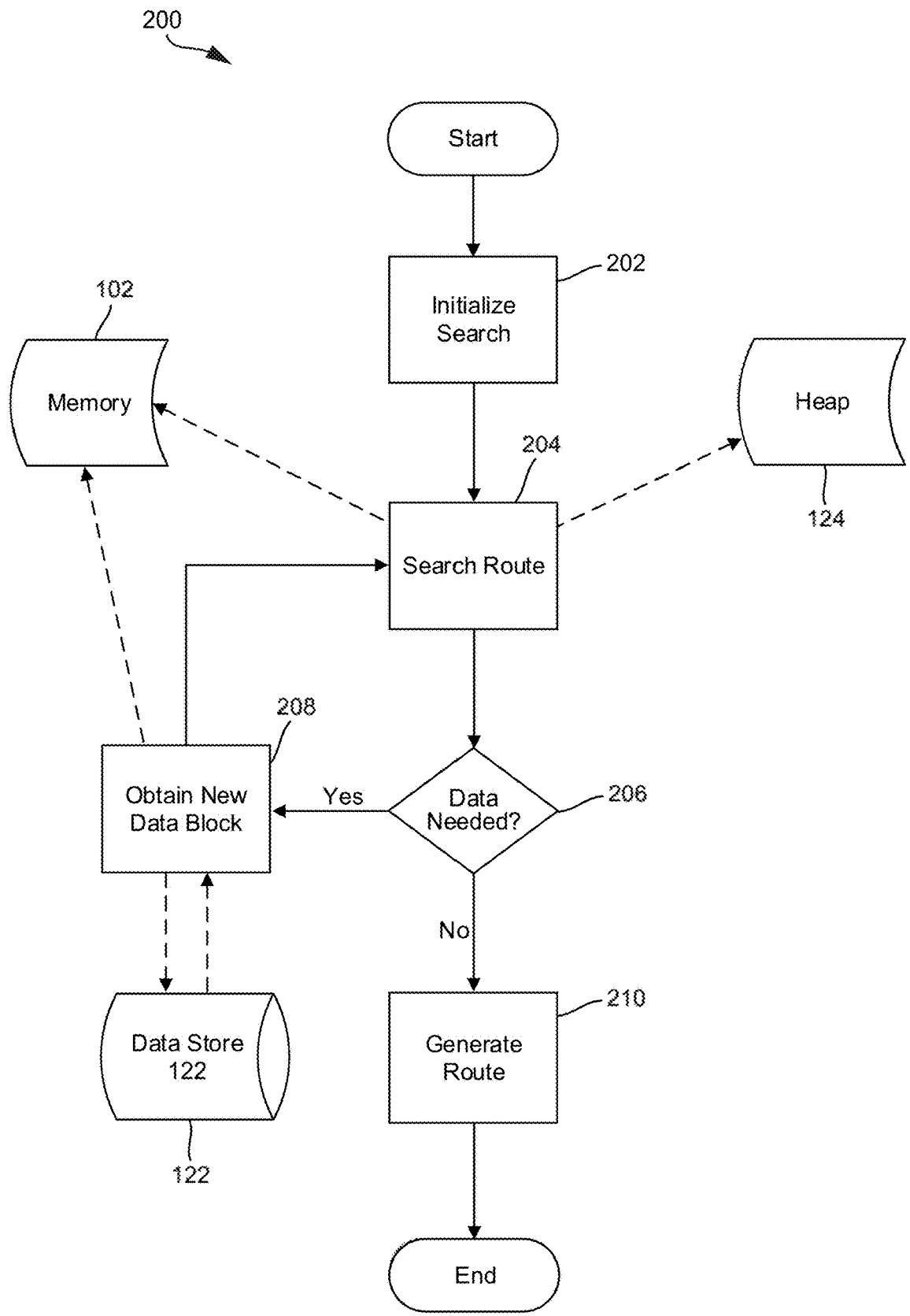
FIG. 2 is a flowchart illustrating an example process for determining a route for a route-based project, in accordance with some examples of the present disclosure.

FIG. 2 is a flowchart illustrating an example process 200 for determining a route for a route-based project. For the sake of clarity, the process 200 is described in terms of the route generation system 100, as shown in FIG. 1, configured to perform the process 200. The steps outlined herein are exemplary and can be implemented in any combination thereof, including combinations that exclude, add, or modify certain steps.

At block 202, the route generation system 100 can initialize a search for an optimal route in a route-based project. The optimal route can include a route/path identified according to specific factors (e.g., costs, properties, considerations, variables, etc.) associated with the route-based project and/or the target geographical area. In some examples, the optimal route can include a route that satisfies or best satisfies one or more (or all) of the factors associated with the route-based project and/or a balance of factors associated with the route-based project. In some cases, the optimal route can include the route that satisfies or best satisfies one or more (or all) of the factors and/or a balance of the factors relative to (e.g., in comparison to) one or more other possible routes. For example, in some cases, the optimal route can include a least-cost route identified for a target geographical area and route-based project.

In some cases, when initializing the search, the route generation system 100 can instantiate one or more components such as, for example, the memory 102, the data store 122, the heap 124, and/or any other components. In some examples, the memory 102 can represent a data cache storing cost surface data, as further explained herein. In some examples, the initializing can also include opening connections to the data store 122.

In some cases, when initializing the search, the route generation system 100 can push (e.g., send) a start node (e.g., a node corresponding to a starting point and/or initial geographic location for the route-based project, a first node sequentially in a route and/or the route determination process, a first node (e.g., logically and/or operationally) among other potential nodes, a node that does not depend on another node(s), a node corresponding to an ingress area of a route, etc.) to the heap 124. In some examples, the route generation system 100 can pass the start node to the heap 124 via one or more parameters such as, for example, node coordinates, a node identifier, node properties, node characteristics, (e.g., shape, size, dimension(s), etc.), and/or any other parameter(s).

At block 204, the route generation system 100 can search for the optimal route. In some examples, the route generation system 100 can call a route optimization algorithm (e.g., the route optimization engine 120 or an algorithm implemented by the route optimization engine 120) to find the optimal route. For example, the route generation system 100 can call the route optimization engine 120 and pass parameters to the route optimization engine 120 that indicate the starting and ending nodes of the optimal route being searched. The route generation system 100 can also pass to the route optimization engine any others parameters used and/or needed by the particular algorithm implemented by the route optimization engine 120. In some cases, when calling the route optimization engine 120, the route generation system 100 can pass to the route optimization engine 120 a reference to the instantiated memory 102, the data store 122, the heap 124, and/or any other component.

In some examples, at this level of abstraction, the route optimization engine 120 can attempt to initiate an analysis of the cost surface and, at a lower level in the code, the route optimization engine 120 can stand at (e.g., can process, analyze, stay/pause at for a certain period of time or until a certain condition is satisfied or stage/operation completed, etc.) the start node that was passed to it and attempt to initiate the search by looking at all the nodes that are contiguous/adjacent to the start node. The contiguous/adjacent nodes can be referred to or identified as neighbor nodes.

In some examples, when searching for the route, the route optimization engine 120 can cache node data in the memory 102, and retrieve the node data from the memory 102 for analysis. For example, the memory 102 can cache cost surface nodes used by the route optimization engine 120 to find the optimal route. In some examples, the route optimization engine 120 can additionally or alternatively access node data for nodes being analyzed from the heap 124. The heap 124 can maintain a list of open nodes being analyzed. In some cases, the heap 124 can maintain the list of open nodes in a particular order or rank such as, for example, in ascending or descending order. The open nodes can by ordered or ranked based on one or more criteria defined by the route optimization engine 120. In some examples, the criteria for ranking open nodes in the heap 124 can include a projected cost associated with the open nodes.

In some cases, the projected cost can be determined by adding an accumulated cost obtained by backtracking from a current node to the start node, and an estimated additional cost for reaching the end node from the current node. The heap 124 can include a list of open nodes ranked by the projected cost determined by adding the accumulated cost and the estimated additional cost as described above.

At block 206, the route optimization engine 120 can determine whether data is needed for the search. For example, the route optimization engine 120 can query the memory 102 for node data and determine whether the queried data is available at the memory 102. Since the memory 102, which in some examples represents a data cache or buffer, may not yet be populated with data (e.g., node data, etc.) for the search, the attempt of the route optimization engine 120 to initiate the search by looking for the neighbor nodes may fail. For example, at this point in the process 200, the memory 102 may not contain the node and/or search data as the memory 102 may not yet have been populated with such data. Accordingly, in some cases, the route optimization engine 120 can generate a message to the caller indicating that the memory 102 is empty and/or is missing certain data. In some examples, the route optimization engine 120 can return a message indicating that data is needed at certain coordinates (e.g., coordinates X and Y). The coordinates can correspond to and/or identify one or more nodes associated with the data needed. In some examples, the coordinates can identify the location and/or configuration (e.g., size, shape, dimension, etc.) of the geometry associated with the data being requested (and/or the one or more nodes associated with the data being requested).

In some examples, the heap 124 may not yet include the list of open nodes if the node data has not yet been loaded in the memory 102 and/or obtained by the route optimization engine 120 for analysis. In some cases, when the route optimization engine 120 obtains node data from the memory 102 for analysis, the route optimization engine 120 can provide to the heap 124 a list of open nodes associated with the node data being (and/or to be) analyzed. The heap 124 can maintain the list of open nodes as previously explained.

At block 208, if the route optimization engine 120 determines that the data is needed, the route optimization engine 120 can obtain a new data block from the data store 122. The new data block can include the data containing the requested node (e.g., the node at specified coordinates). In some examples, the new data block can also include one or more neighbor nodes around the requested node (e.g., around the coordinates associated with the requested node). In some cases, the one or more neighbor nodes can include one or more or all nodes that are adjacent to the requested node.

Once the route optimization engine 120 obtains the new data block, the route optimization engine 120 can place/store the new data block in the memory 102 for fast/cached retrieval. The route optimization engine 120 can then return to block 204 to again attempt the search. The route optimization engine 120 can again determine at block 206 whether additional data is needed. If the route optimization engine 120 determines that additional data is needed, it can similarly return to block 208 to obtain the additional data. Alternatively, if the route optimization engine 120 determines that more data is not needed, the route optimization engine 120 can continue the search and proceed to block 210. In some cases, any new data block obtained by the route optimization engine 120 from the data store 122 can be used by the route optimization engine 120 to expand the search without further interruptions until a new data needed condition is raised at block 206.

In some examples, the route optimization engine 120 can continue through multiple iterations of the search process (e.g., blocks 204, 206, 208) until it reaches the end node that was identified in a parameter along with the start node at the beginning of the process 200. For example, the route optimization engine 120 can continue the search from the start node and analyze each subsequent node until it arrives at the end node. In some cases, the route optimization engine 120 can interpret arriving at the end node as a completion of the search process. In some examples, the route optimization engine 120 can then generate an indication, flag, signal, etc., indicating that no more data is needed and/or that the optimal route has been found.

At block 210, once the end node has been reached, the route optimization engine 120 can generate the desired/optimal route. In some examples, the route optimization engine 120 can invoke a process to produce the desired route. In some cases, the route optimization engine 120 can generate the route by backtracking all of the nodes linked by the route optimization engine 120 during the process 200, starting at the end node and moving backwards to the start node. In some examples, one or more techniques can be used to further process the route. To illustrate, in an example non-limiting technique, the process 200 can trace back the nodes that make up the optimal route by following the references to the "parent" or "previous" nodes that are created, as all the possible routes are analyzed by the algorithm. Using this non-limiting example technique, the process 200 can generate a route which can include, for example, a list of contiguous and interconnected nodes. In another example non-limiting technique, the process 200 can trace the route back as exampled in the previous example, but can interconnect each node with the farthest node in the sequence of nodes that has the same weight as the current node and can be "seen" from the current node without any other node of a different "weight" laying in between. In the result, the optimal route can be represented by a series of line segments rather than a series of nodes or points, which can facilitate and/or simplify manual manipulation at a later stage during the route planning process.

In some cases, the projected cost can be determined by adding an accumulated cost obtained by backtracking from a current node to the start node, and an estimated additional cost for reaching the end node from the current node. The heap 124 can include a list of open nodes ranked by the projected cost determined by adding the accumulated cost and the estimated additional cost as described above.

In some cases, the route optimization engine 120 can link nodes during the process 200 based on the list of ranked open nodes in the heap 124. In some cases, the linked nodes can include one or more (or all) of the nodes in the list of open nodes in the heap 124. Moreover, in some examples, the route optimization engine 120 can use list of open nodes in the heap 124 to generate the route as previously described.

Figure 3:
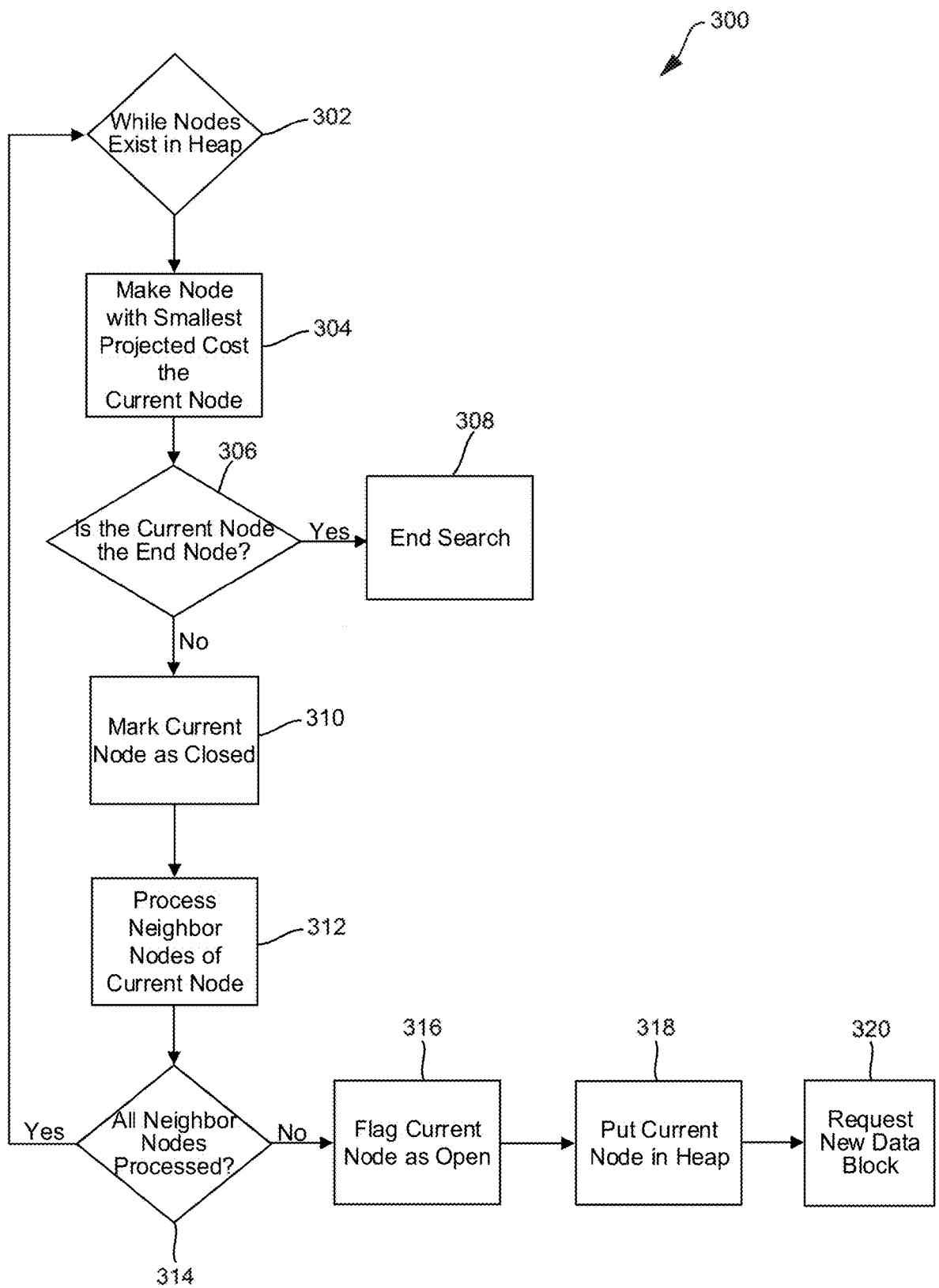
FIG. 3 is a flowchart illustrating an example route optimization process for determining a route for a route-based project, in accordance with some examples of the present disclosure.

FIG. 3 is a flowchart illustrating an example route optimization algorithm 300 (or process) implemented by the route optimization engine 120. In some examples, the route optimization engine 120 can implement the route optimization algorithm 300 to search for an optimal route according to one or more blocks in FIG. 2, such as block 204, block 206, block 208, and/or block 210 shown in FIG. 2.

At block 302, the route optimization algorithm 300 initiates a loop that lasts as long as there are nodes in the heap 124 or until the end node is reached. In some examples, the end node can be reached after traversing one or more nodes in the heap 124.

During each iteration of the loop, the route optimization algorithm 300 can retrieve the node with the lowest projected cost from the heap 124. For example, at block 304, the route optimization algorithm 300 can retrieve the node with the lowest projected cost from the heap 124 and make the node with the lowest projected cost the current node (or the new current node) processed.

At block 306, the route optimization algorithm 300 can determine whether the current node (e.g., the node set as the current node at block 304) is the end node. If the current node is the end node, at block 308 the route optimization algorithm 300 can end the search. In some examples, the route optimization algorithm 300 can return an indication that the search is complete. In some cases, the route optimization algorithm 300 can end the loop and further analysis and return control to the calling context.

On the other hand, at block 310, if the current node is not the end node, the route optimization algorithm 300 can mark/flag the current node as closed. Marking/flagging the current node as closed can indicate that analysis of the current node is complete.

At block 312, the route optimization algorithm 300 can then process neighbor nodes (e.g., one or more adjacent/continuous nodes) of the current node. In some examples, the route optimization algorithm 300 can analyze each neighbor node (e.g., each node that is adjacent/contiguous to the current node).

At block 314, the route optimization algorithm 300 can determine whether all neighbor nodes have been processed. If at block 314 the route optimization algorithm 300 determines that all neighbor nodes have been processed, the route optimization algorithm 300 can return to block 302. On the other hand, if the route optimization algorithm 300 determines that not all neighbor nodes have been processed, the route optimization algorithm 300 can mark the current node as open at block 316. In some cases, a determination that not all neighbor nodes have been processed can indicate that one or more neighbors of the current node were missing from the memory 102.

At block 318, the route optimization algorithm 300 can then put the current node marked as open back into the heap 124. This can allow the analysis of the open node to resume after a new data block is available. At block 320, the route optimization algorithm 300 can request a new data block for the search. In some examples, the route optimization algorithm 300 can return a signal or code to the calling context indicating that data is needed at certain coordinates. For example, the route optimization algorithm 300 can generate an indication that data is needed at coordinates X and Y.

Figure 4:
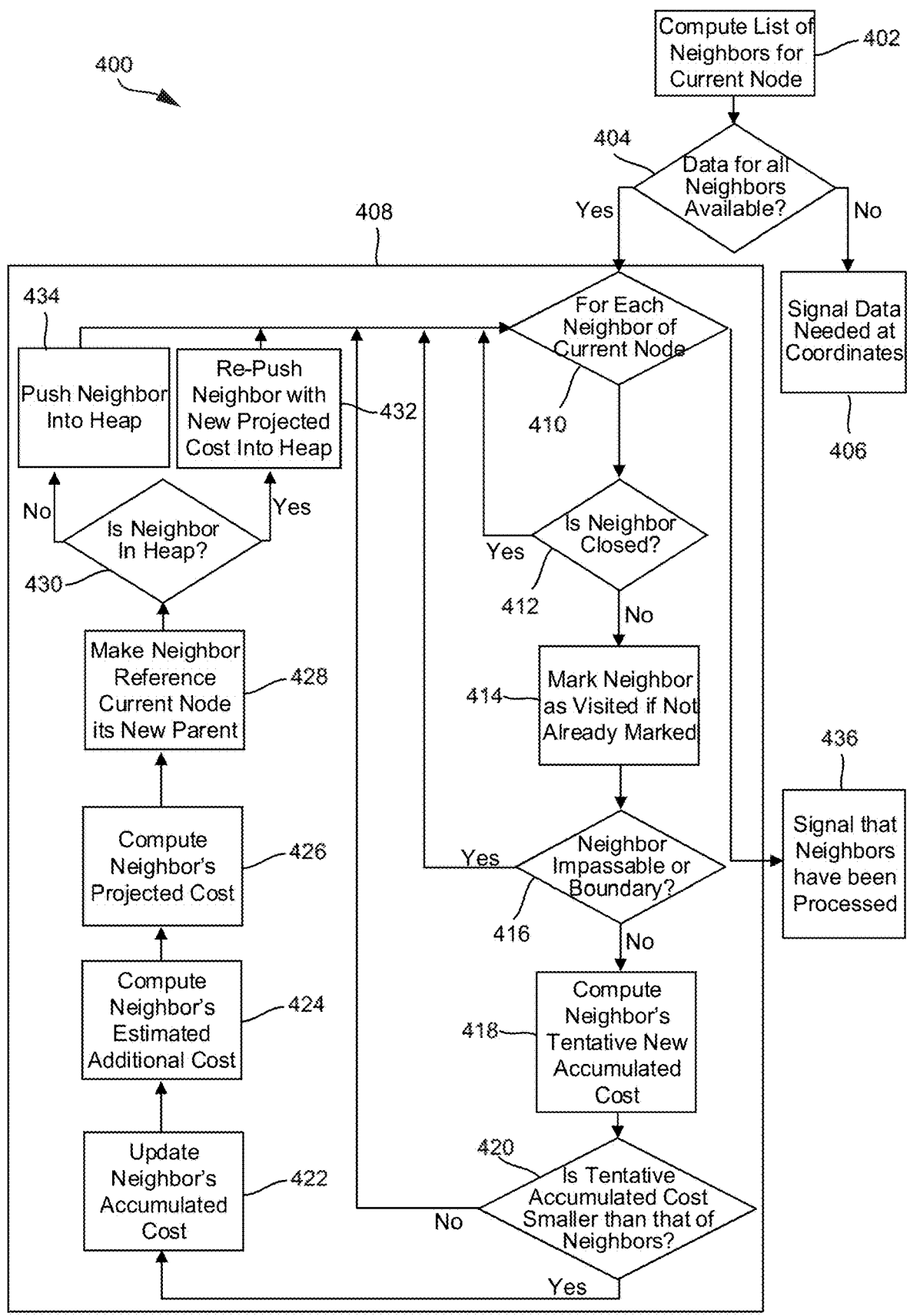
FIG. 4 is a flowchart illustrating example adaptations implemented in an example route optimization process for determining a route for a route-based project, in accordance with some examples of the present disclosure.

FIG. 4 is a flowchart illustrating an example process 400 for processing neighbor nodes of a current node. In some examples, the process 400 can include a sub-process 408 corresponding to block 312 of the route optimization algorithm 300 shown in FIG. 3. For the sake of clarity, the process 400 and sub-process 408 are described below in terms of the route generation system 100, as shown in FIG. 1, configured to perform the process 400 and the sub-process 408. The steps outlined herein are exemplary and can be implemented in any combination thereof, including combinations that exclude, add, or modify certain steps.

At block 402, the route determination system 100 can compute a list of neighbor nodes of the current node. At block 404, the route determination system 100 can determine whether the data for all of the neighbor nodes is available in the memory 102. In some examples, the route determination system 100 can verify that the data of all the neighbor nodes is loaded into the memory 102 before/when analyzing the neighbor nodes. If the data of any of the neighbor nodes is not available in the memory 102, the route determination system 100 can proceed to block 406. If the data of all the neighbor nodes is available in the memory 102, the route determination system 100 can proceed to sub-process 408.

At block 406, if the data of any of the neighbor nodes is missing from the memory 102, the route determination system 100 can signal back or return an indication that certain data is needed. For example, the route determination system 100 can generate an indication that data is needed at certain coordinates (e.g., data is needed at coordinates X and Y) associated with the neighbor nodes for which data is needed. In some examples, the route determination system 100 can request the missing data from the data store 122. In some cases, upon receiving the missing data from the data store 122, the route determination system 100 return to block 404 or proceed to sub-process 408.

On the other hand, if all the data pertaining to the calculated neighbor nodes is available in the memory 102, the route determination system 100 can proceed to sub-process 408. The route determination system 100 can perform the sub-process 408 until all neighbor nodes have been processed. Once all the neighbor nodes have been processed, at block 436, the route determination system 100 can return a signal or indication that all neighbor nodes have been processed.

For example, at block 410 of the sub-process 408, the route determination system 100 can start a loop for each neighbor node of the current node. The loop can continue until all neighbor nodes are processed. At block 412 of the sub-process 408, the route determination system 100 can determine whether a neighbor node is closed. In some examples, a neighbor node can be closed when the analysis of that node is complete.

The first neighbor node processed at block 412 can be a neighbor node processed in the first loop of the sub-process 408 (e.g., the first neighbor node of the current node processed in the loop associated with the sub-process 408). In some cases, the first loop can be one of multiple loops. In other cases, the first loop can be the only loop.

If the neighbor node is closed, the route determination system 100 can return to block 410 of the sub-process 408 and move to a next neighbor node, if one exists. If the neighbor node is not closed, the route determination system 100 can proceed to block 414 of the sub-process 408. At block 414, the route determination system 100 can mark the neighbor node as visited if the neighbor node is not already marked as such. In some cases, marking a node as visited can indicate that the node has been considered for the route. For example, marking a node as visited can indicate that the node has already been considered for the route.

In some cases, marking a node as visited can indicate that a new analysis is not needed for that node because the node has already been considered. In some cases, marking a node as visited can be used to represent in a route determination output that the node was considered in determining the optimal route. In some examples, this can be used to represent in the route determination output what nodes have been considered but excluded from the route in addition to what nodes have been considered and included in the route.

At block 416 of the sub-process 408, the route determination system 100 can determine whether the neighbor node is a boundary node or an impassable node. If the route determination system 100 determines that the neighbor node is a boundary or impassable node, the route determination system 100 can return to block 410 of the sub-process 408 to process the next neighbor node (or exit if that neighbor node is the last neighbor node). Here, the route determination system 100 can simply mark the neighbor node as visited and subsequently ignore the neighbor node.

An impassable node can represent a node (e.g., a "no go" node) that cannot be part of, or included in, the route (e.g., because the route cannot go to that node). In some examples, an impassable node property can be assigned to nodes that represent geographical coordinates having a something that is not suitable for pipeline construction, such as for example a building, a landmark, an urban area, a military base, etc. The route determination system 100 can flag such no-go areas so the route optimization algorithm does not provide routes that intersect nodes associated with such no-go areas.

At block 418 of the sub-process 408, if the neighbor node is not a boundary or impassable node, the route determination system 100 can compute a tentative new accumulated cost for the neighbor node. In some examples, the route determination system 100 can calculate the tentative new accumulated cost by adding the current node's accumulated cost to the neighbor node's own cost/weight.

At block 420 of the sub-process 408, the route determination system 100 can determine if the tentative new accumulated cost calculated for the neighbor node is smaller than a current accumulated cost of the neighbor node. If the tentative new accumulated cost is not smaller than the current accumulated cost, the route determination system 100 can return to block 410 of the sub-process 408. On the other hand, if the tentative new accumulated cost is smaller than the current accumulated cost, the route determination system 100 can proceed to block 422 of the sub-process 408.

At block 422 of the sub-process 408, the route determination system 100 can update the accumulated cost of the neighbor node according to the tentative new accumulated cost. For example, the route determination system 100 can update the accumulated cost of the neighbor node to the tentative new accumulated cost calculated at block 418.

At block 424 of the sub-process 408, the route determination system 100 can compute the estimated additional cost of the neighbor node. The estimated additional cost can include an estimated cost needed to reach the end node from the neighbor node.

At block 426 of the sub-process 408, the route determination system 100 can compute the projected cost of the neighbor node. In some examples, the route determination system 100 can calculate the projected cost of the neighbor node by adding the estimated additional cost from block 424 and the accumulated cost from block 422.

At block 428 of the sub-process 408, the route determination system 100 can make the neighbor node reference the current node as the parent of the neighbor node. In some examples, referencing the current node as the parent of the neighbor node can associate the current node to the neighbor node and/or indicate a relationship between the current node and the neighbor node. In some cases, the reference can establish a parent-child relationship that can indicate a sequence/order of such nodes, a node processing sequence/relationship between such nodes, and/or a cost accumulation sequence/order associated with such nodes. In some examples, the route determination system 100 can add a reference to the memory 102, the data store 122, and/or the heap 124 indicating that the current node is the parent of the neighbor node. For example, the route determination system 100 can add a reference in the heap 124 to indicate that the current node is a parent of the neighbor node.

At block 430 of the sub-process 408, the route determination system 100 can determine whether the neighbor node is already in the heap 124. At block 432 of the sub-process 408, if the neighbor node is already in the heap 124, the route determination system 100 can re-push the neighbor node into the heap 124 with the new projected cost from block 426. The route determination system 100 can then return to block 410 of the sub-process 408. On the other hand, if the neighbor node is not already in the heap 124, at block 434 of the sub-process 408, the route determination system 100 can push the neighbor node into the heap 124 and return to block 410.

If, at block 410 of the sub-process 408, the route determination system 100 determines that all neighbor nodes have been processed, the route determination system 100 can exit the sub-process 408. The route determination system 100 can then proceed to block 436 of the process 400, where the route determination system 100 can signal that the neighbor nodes have been processed.

Figure 5A:
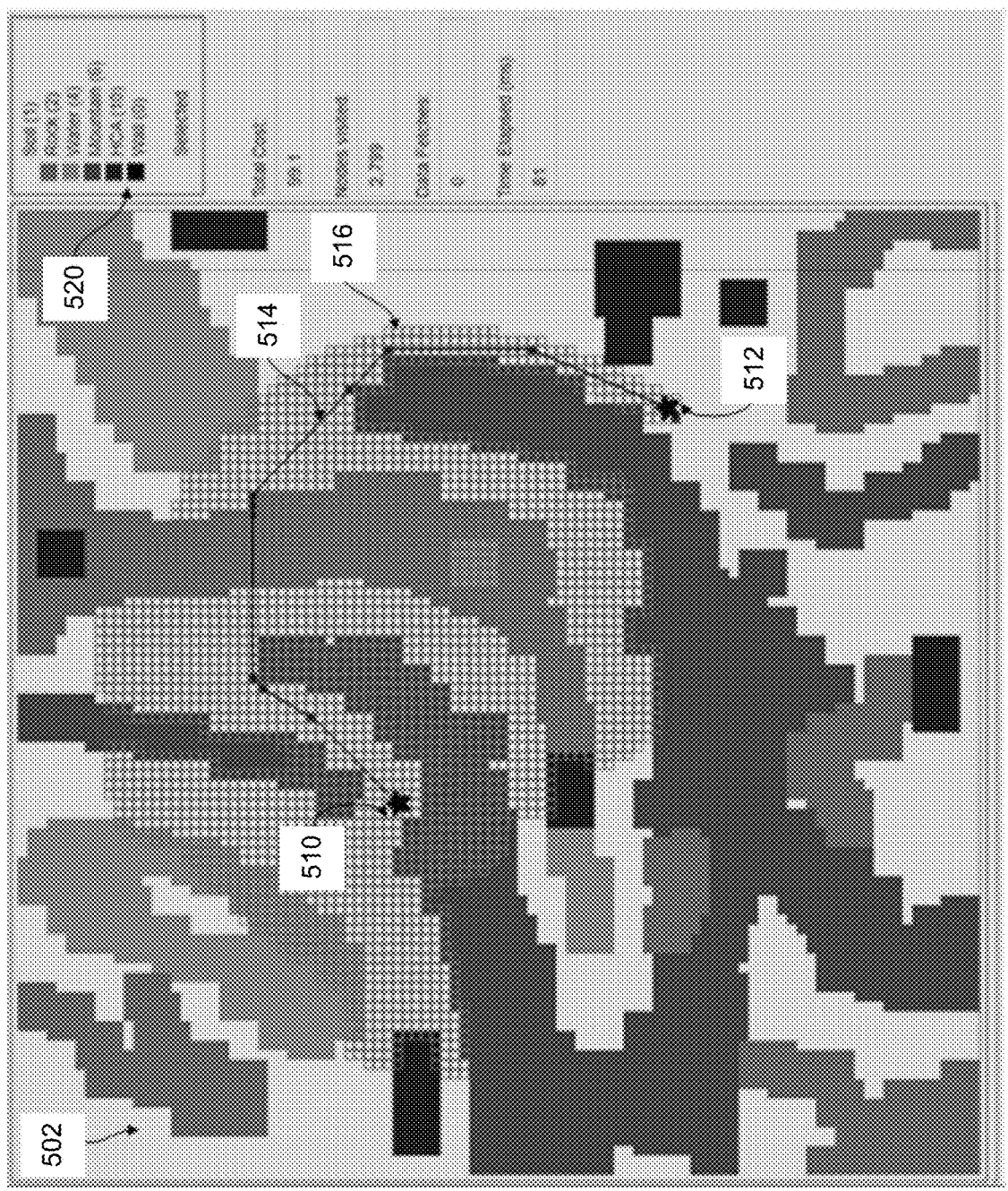
FIG. 5A is a graph illustrating an example route determination output, in accordance with some examples of the present disclosure.

FIG. 5A is a graph illustrating an example route determination output 500. In some examples, the route determination output 500 can be rendered/presented in a display device such as, for example, a screen, a television, a monitor, etc. The route determination output 500 can include a visual representation of a portion of a cost surface 502.

In some examples, the route determination output 500 can include a legend 520 identifying how each weight (e.g., each cost value, factor, and/or parameter) associated with each cost surface node is represented in the route determination output 500, such as what characteristics (e.g., color, tone, pattern, attributes, etc.) are used to represent each weight associated with each cost surface node. For example, in some cases, the legend 520 can identify different colors, color tones, patterns, etc., are used to indicate different weights associated with specific cost surface nodes.

The route determination output 500 depicts a route 514 determined from/in the cost surface 502. The route 514 can include a path from a start node 510 to an end node 512. The route 514 can be determined based on the start node 510, the end node 512, and cost surface data. The route determination output 500 can also identify visited nodes 516. In some examples, the visited nodes 516 can be identified based on one or more visual attributes and/or patterns. For example, the visited nodes 516 can be represented as outlined shapes (e.g., squares, circles, rectangles, etc.), as shown in the illustrative example in FIG. 5A.

As shown in FIG. 5A, the route determination output 500 includes a large amount of cost surface nodes. Moreover, in this example, a large amount of cost surface nodes were preloaded and displayed on the user interface presenting the route determination output 500. The large amount of cost surface nodes can fill, span, and/or utilize a larger portion (or all) of the displays available real estate (e.g., the screen real estate). The large amount of cost surface nodes in this example also includes a number of nodes that were loaded/analyzed unnecessarily.

Figure 5B:
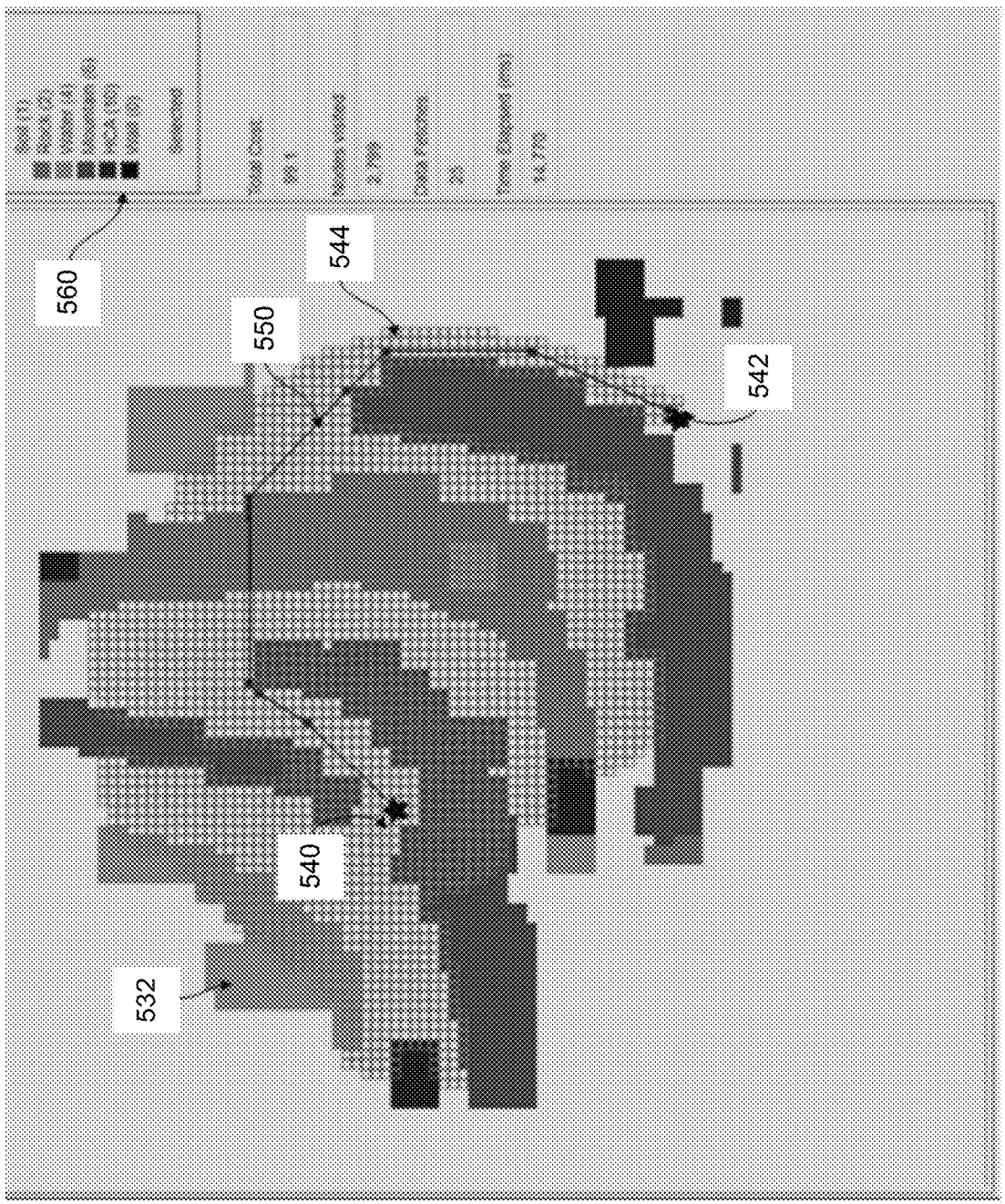
FIG. 5B is a graph illustrating an example route optimization output, in accordance with some examples of the present disclosure.

However, as shown in FIG. 5B and further described below, when determining an optimal route, the route generation system 100 (e.g., via the route optimization engine 120) can implement the route optimization techniques described herein to optimize the route determination process and reduce the number of nodes loaded unnecessarily, the display/screen real estate used to present/render a route optimization output, the amount of available cost surface analyzed to determine an optimal route, etc. In some examples, the route generation system 100 can implement the route optimization techniques described herein to also increase the efficiency of the route optimization process, the performance of the route optimization process, and/or accuracy of the route optimization process.

FIG. 5B is a graph illustrating an example route optimization output 530 generated by the route generation system 100. In some examples, the route generation system 100 can present/render the route optimization output 530 in a display device such as, for example, a screen, a television, etc. In other examples, the route generation system 100 can send the route optimization output 530 to one or more other electronic devices for storage and/or display.

When generating the route optimization output 530, the route generation system 100 can optimize the route determination process and reduce the number of nodes loaded unnecessarily, the display/screen real estate used to present/render a route optimization output, the amount of available cost surface analyzed to determine an optimal route, etc. For example, the route generation system 100 can generate the route optimization output 530 via the route optimization engine 120 based on any of the process 200, the route optimization algorithm 300, the process 400, and/or the sub-process 408 described above with respect to FIGS. 2 through 4. In some examples, the route optimization used to generate the route optimization output 530 can also increase the efficiency of the route optimization process, the performance of the route optimization process, and/or accuracy of the route optimization process.

The route optimization output 530 can include a visual representation of the cost surface 532. In some examples, the route optimization output 530 can include a legend 560 identifying how each weight (e.g., each cost value, factor, and/or parameter) associated with each cost surface node is represented in the route optimization output 530, such as what characteristics (e.g., color, tone, pattern, attributes, etc.) are used to represent each weight associated with each cost surface node. For example, in some cases, the legend 560 can identify different colors, color tones, patterns, etc., are used to indicate different weights associated with specific cost surface nodes.

The route optimization output 530 depicts an optimal route 550 determined from/in the cost surface 532. The optimal route 550 can include a path from a start node 540 to an end node 542. The route generation system 100 can determine the optimal route 550 based on the start node 540, the end node 542, and cost surface data in the data store 122. The route optimization output 530 can identify visited nodes 544. In some examples, the visited nodes 544 can be identified based on one or more visual attributes and/or patterns. For example, the visited nodes 544 can be represented as outlined shapes (e.g., squares, circles, rectangles, etc.), as shown in the illustrative example in FIG. 5B.

As shown in FIG. 5B, the cost surface 532 associated with the route optimization output 530 is smaller than the cost surface 502 of the route determination output 500 in FIG. 5A. Moreover, as illustrated in this example, the area occupied by the cost surface nodes in the cost surface 532 relative to the area occupied by the visited nodes 544 is much smaller than the area occupied by the cost surface nodes in the cost surface 502 shown in FIG. 5A relative to the area occupied by the visited nodes 516 shown in FIG. 5A. In some examples, the area occupied by the cost surface nodes in the cost surface 532 may be slightly larger than the area occupied by the visited nodes 544. On the other hand, the area occupied by the cost surface nodes in the cost surface 502 shown in FIG. 5A may be much larger (e.g., as compared to the area of the cost surface 532 in FIG. 5B) to the area occupied by the visited nodes 516 shown in FIG. 5A.

In some examples, when generating the route optimization output 530, the route generation system 100 can dynamically fetch the cost surface nodes rather than preloading the cost surface nodes at once before starting the node analysis and/or route determination analysis. This can result in a more efficient use of the available memory of the route generation system 100. This can also reduce the size of the cost surface 532 and/or the area occupied by the cost surface nodes in the cost surface 532 relative to the area occupied by the visited nodes 544.

Moreover, by dynamically fetching the cost surface nodes, the route generation system 100 can generate (e.g., via the route optimization engine 120) the route optimization output 530 without using an arbitrarily preloaded portion of the available cost surface as a bounding box. As previously explained, when otherwise using a preloaded portion of the available cost surface as a bounding box, it can be very difficult or even impossible to ensure that such a bounding box will contain the optimal route being searched for. Such a route optimization process using a bounding box can essentially become a trial-and-error approach involving multiple iterations of attempts before an optimal solution is identified. The multiple iterations can be time consuming, inefficient, and/or resource intensive. Moreover, while increasing the size of the bounding box can increase the chances of finding an optimal solution within a fewer amount of iterations, the increased size of the bounding box can in many cases counter any time, resource, and/or processing benefits from reducing the searching area to a bounding box.

A route optimization output, such as the route optimization output 530 shown in FIG. 5B, can be generated for any route-based project. Moreover, the route optimization techniques described herein can be used for any route-based project. Non-limiting examples of route-based projects can include pipeline projects, roads, railroad tracks, buried cable, environmental survey areas, power lines, tunnels, and right-of-way areas, among others.

Figure 6:
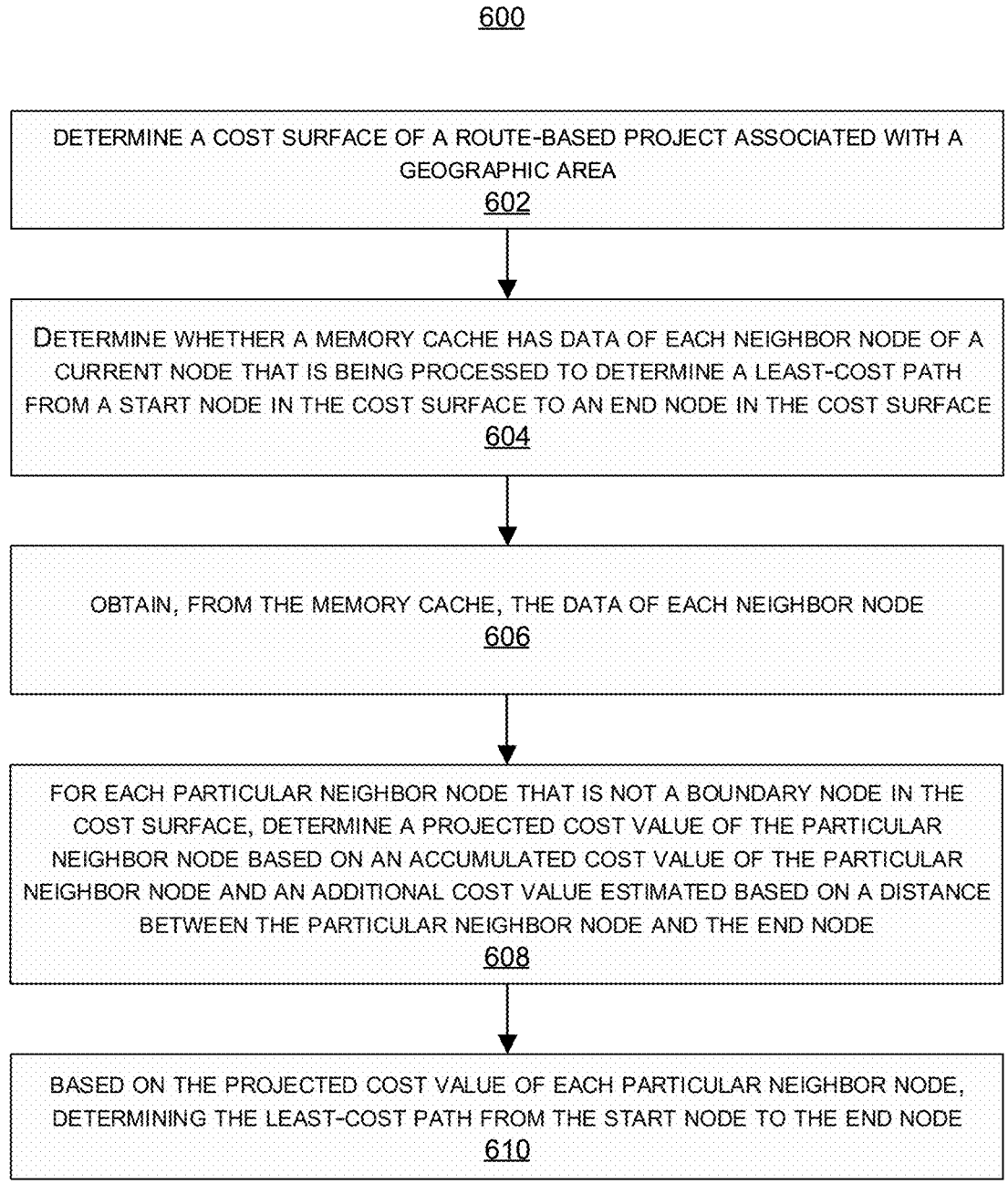
FIG. 6 is a flowchart illustrating an example process for improved memory management for route optimization algorithms, in accordance with some examples of the present disclosure.

FIG. 6 is a flowchart illustrating an example process 600 for improved memory management for an example route optimization algorithm. For the sake of clarity, the process 600 is described in terms of the route generation system 100, as shown in FIG. 1, configured to perform the process 600. The steps outlined herein are exemplary and can be implemented in any combination thereof, including combinations that exclude, add, or modify certain steps.

At block 602, the route generation system 100 can determine a cost surface of a route-based project associated with a geographic area. In some examples, the cost surface can include a plurality of nodes, and each node of the plurality of nodes can include one or more cost values associated with a respective location within the geographic area. The respective location can correspond to the node. Moreover, the cost can include one or more costs in terms of time, risk distance, difficulty, resources, effort, monetary expenditure, environmental impact, social cost/impact, legal cost, adherence to project requirements, engineering/technological costs/challenges, and/or any other costs.

At block 604, the route generation system 100 can determine whether a memory cache (e.g., memory 102) has data of each neighbor node of a current node that is being processed to determine a least-cost path from a start node in the cost surface to an end node in the cost surface.

In some examples, determining whether the memory cache has the data of each neighbor node of the current node can include determining that the memory cache does not contain data of one or more neighbor nodes of the current node; sending, to a data store (e.g., data store 122), a request for the data of the one or more neighbor nodes; receiving, from the data store, the data of the one or more neighbor nodes; and storing the data of the one or more neighbor nodes in the memory cache. In some cases, the request can include and/or specify the respective coordinates of each of the one or more neighbor nodes. In some examples, the respective coordinates can identify where the one or more neighbor nodes are located in the cost surface and/or geographic area. In some examples, the respective coordinates can identify a location and/or configuration (e.g., size, shape, dimensions, etc.) of a geometry corresponding to the one or more neighbor nodes for which data is requested.

In some cases, the route generation system 100 can determine that the memory cache is missing data of one or more neighbor nodes of the current node and, based on the determination, retrieve the data of the one or more neighbor nodes from a data store (e.g., data store 122) and store the data of the one or more neighbor nodes in the memory cache. The data of the one or more neighbor nodes can be retrieved based on respective coordinates of the one or more neighbor nodes.

At block 606, the route generation system 100 can obtain, from the memory cache, the data of each neighbor node. For example, the route generation system 100 can send a request to the memory cache for the data of each neighbor. In some cases, the route generation system 100 can check and/or verify that the memory cache has the data for all of the neighbor nodes of the current node and, if any data is missing from the memory cache, the route generation system 100 can request such data from a data store (e.g., data store 122) that has the data associated with all of the neighbor nodes and/or all of the plurality of nodes. In some cases, the request for data to the memory cache and/or the data store can specify coordinates of the node(s) associated with the data being requested. The coordinates can identify a location of such node(s) and/or location and/or configuration (e.g., size, shape, dimensions, etc.) of a geometry corresponding to such node(s).

In some cases, the request can request additional data of one or more additional nodes (e.g., a surplus of surrounding nodes) associated with a set of coordinates having a threshold proximity (e.g., adjacent, neighboring within a certain distance and/or number of nodes, etc.) to the respective coordinates of the one or more neighbor nodes. In some examples, the request can include one or more parameters identifying a size and/or a shape of a geometry associated with the one or more neighbor nodes and the one or more additional nodes. The route generation system 100 can store the additional data in the memory cache.

At block 608, the route generation system 100 can determine, for each particular neighbor node that is not a boundary node in the cost surface, a projected cost value of the particular neighbor node based on an accumulated cost value of the particular neighbor node and an additional cost value estimated based on a distance between the particular neighbor node and the end node.

In some examples, the route generation system 100 can determine the projected cost value of the particular neighbor node based on a cost value of the particular neighbor node and a different accumulated cost value of the current node. For example, the route generation system 100 can determine the projected cost value by adding a cost value of the particular neighbor node to the accumulated cost value of the current node.

At block 610, the route generation system 100 can determine, based on the projected cost value of each particular neighbor node, the least-cost path from the start node to the end node. In some cases, the route generation system 100 can determine the least-cost path from a plurality of possible paths from the start node to the end node. In some examples, the route generation system 100 can determine the least-cost path based on a total projected cost associated with the least-cost path.

In some aspects, the route generation system 100 can indicate, based on a determination that one or more neighbor nodes of the current node have not been processed, that the current node is an open node being processed; add a reference to the open node to a list of nodes having respective node data stored in the memory cache; obtain, from a data store (e.g., data store 122), data associated with the one or more neighbor nodes that have not been processed; and store the data of the one or more neighbor nodes in the memory cache. In some examples, the list of nodes can be stored and/or maintained in a data structure (e.g., heap 124). In some cases, nodes in the list of nodes can be ranked according to respective cost values associated with the nodes.

In some aspects, the route generation system 100 can update, based on a determination that the accumulated cost value of the particular neighbor node is smaller than a current accumulated cost value of the particular neighbor node, the current accumulated cost value of the particular neighbor node based on the accumulated cost value of the particular neighbor node. In some cases, the route generation system 100 can set the current node as a parent of the particular neighbor node.

In some examples, the route generation system 100 can update, based on a determination that the particular node is in a list of nodes having respective node data stored in the memory cache, the list of nodes to include the particular node with the updated current accumulated cost value. In some examples, the route generation system 100 can add the particular node to the list of nodes based on a determination that the particular node is not in a list of nodes having respective node data stored in the memory cache.

In some aspects, the route generation system 100 can determine (e.g., identify, select, etc.) the current node based on a list of nodes from the plurality of nodes and, prior to processing each neighbor node of the current node, determine whether the current node is the end node. In some cases, the current node can include a node having a lowest cost value from a set of cost values associated with other nodes in the list of nodes.

In some aspects, for each node in a list of nodes identifying those of the plurality of nodes having data stored in the memory cache, the route generation system 100 can obtain, from the memory cache, additional data of each additional neighbor node of a new current node selected from the list of nodes; and determine, for each additional neighbor node that is not the boundary node in the cost surface, an additional projected cost value of the additional neighbor node based on an additional accumulated cost value of the additional neighbor node and a different additional cost value estimated based on a different distance between the additional neighbor node and the end node. In some cases, the route generation system 100 can determine the least-cost path from the start node to the end node further based on the additional projected cost value of each particular neighbor node.

In some examples, prior to determining the projected cost value of each particular neighbor node, the route generation system 100 can verify that the memory cache has the data of each neighbor node of the current node and, prior to processing a new current node associated with the cost surface, verify that each neighbor node of the current node has been processed.

The route generation system 100 can implement the process 600 to determine an optimal route for any route-based project. Non-limiting illustrative examples of route-based projects can include pipeline projects, roads, railroad tracks, buried cable, environmental survey areas, power lines, tunnels, and right-of-way areas, among others. In some examples, the optimal route can include the least-cost path determined from the start node to the end node in the cost surface. In some cases, the least-cost path can a path from the start node to the end node in the cost surface having a lowest cost in terms of time, risk, monetary expenditure, distance, resources, difficulty, environmental impacts, social challenges and/or impacts, legal challenges and/or impacts, engineering/technological challenges, project requirements, and/or any other factors and/or considerations.

In some examples, the processes described herein (e.g., processes 200, 300, 400, 408, 600, and/or any other process described herein) may be performed by a computing device or apparatus. In one example, the process 600 can be performed by the route generation system 100 of FIG. 1. In another example, the process 600 can be performed by the computing system having the computing device architecture 700 shown in FIG. 7. For instance, a computing device with the computing device architecture 700 shown in FIG. 7 can implement the operations of FIG. 6 and/or the components and/or operations described herein with respect to any of FIGS. 1 through 6.

The computing device can include any suitable device, such as a server computer, a mobile device (e.g., a mobile phone), a desktop computing device, a tablet computing device, a laptop computer, and/or any other computing device with the resource capabilities to perform the processes described herein, including the processes 200, 300, 400, 408, 600 and/or any other process described herein. In some cases, the computing device or apparatus may include various components, such as one or more input devices, one or more output devices, one or more processors, one or more microprocessors, one or more microcomputers, one or more cameras, one or more sensors, and/or other component(s) that are configured to carry out the steps of processes described herein. In some examples, the computing device may include a display, a network interface configured to communicate and/or receive the data, any combination thereof, and/or other component(s). The network interface may be configured to communicate and/or receive Internet Protocol (IP) based data or other type of data.

The components of the computing device can be implemented in circuitry. For example, the components can include and/or can be implemented using electronic circuits or other electronic hardware, which can include one or more programmable electronic circuits (e.g., microprocessors, graphics processing units (GPUs), digital signal processors (DSPs), central processing units (CPUs), and/or other suitable electronic circuits), and/or can include and/or be implemented using computer software, firmware, or any combination thereof, to perform the various operations described herein.

The processes 200, 300, 400, 408, and 600 are illustrated as logical flow diagrams, the operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the processes 200, 300, 400, 408, and 600, and/or other process described herein may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

Figure 7:
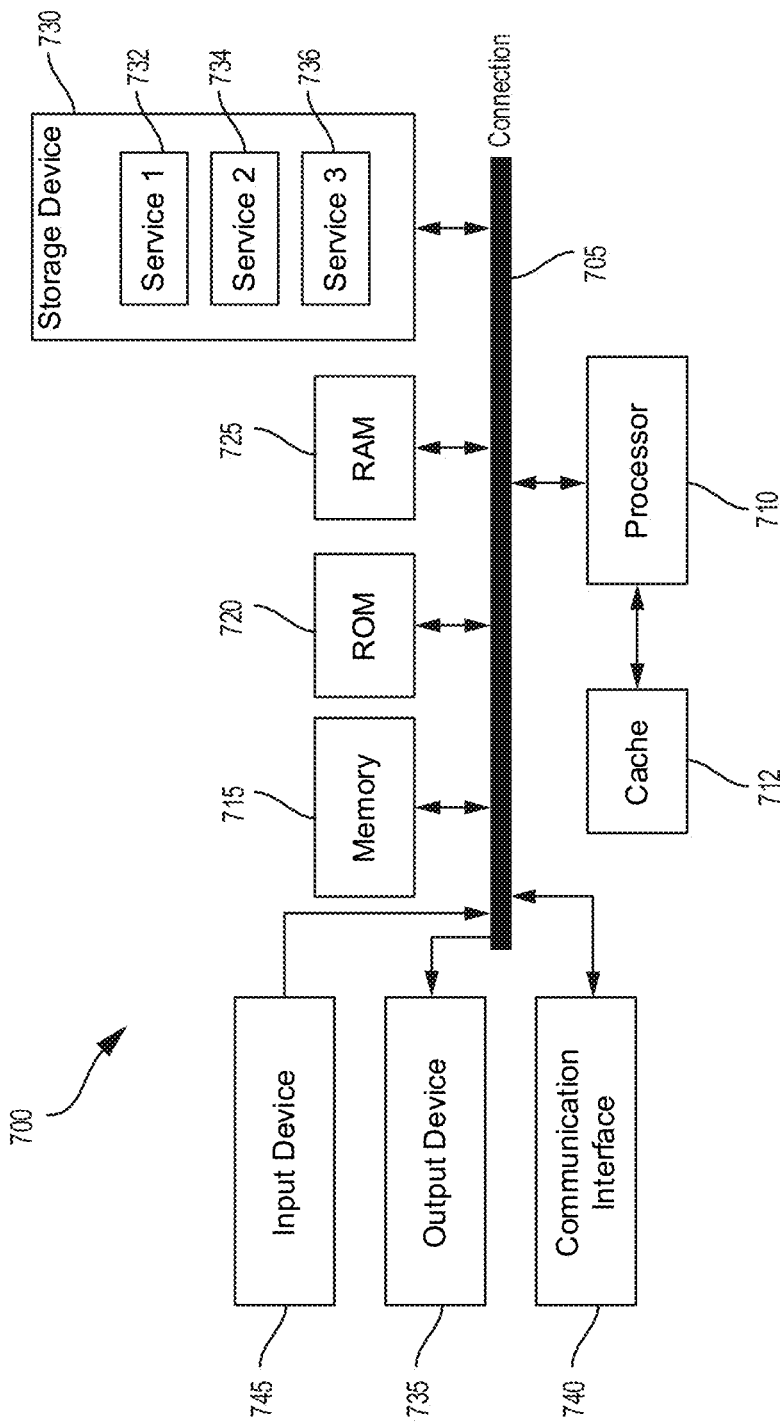
FIG. 7 is a diagram illustrating an example system architecture for implementing certain aspects described herein.

FIG. 7 illustrates an example computing device architecture 700 of an example computing device which can implement various techniques described herein. For example, the computing device architecture 700 can implement at least some portions of the route generation system 100 shown in FIG. 1. The components of the computing device architecture 700 are shown in electrical communication with each other using a connection 705, such as a bus. The example computing device architecture 700 includes a processing unit (CPU or processor) 710 and a computing device connection 705 that couples various computing device components including the computing device memory 715, such as read only memory (ROM) 720 and random access memory (RAM) 725, to the processor 710.

The computing device architecture 700 can include a cache of high-speed memory connected directly with, in close proximity to, or integrated as part of the processor 710. The computing device architecture 700 can copy data from the memory 715 and/or the storage device 730 to the cache 712 for quick access by the processor 710. In this way, the cache can provide a performance boost that avoids processor 710 delays while waiting for data. These and other modules can control or be configured to control the processor 710 to perform various actions. Other computing device memory 715 may be available for use as well. The memory 715 can include multiple different types of memory with different performance characteristics. The processor 710 can include any general purpose processor and a hardware or software service (e.g., service 1 732, service 2 734, and service 3 736) stored in storage device 730 and configured to control the processor 710 as well as a special-purpose processor where software instructions are incorporated into the processor design. The processor 710 may be a self-contained system, containing multiple cores or processors, a bus, memory controller, cache, etc. A multi-core processor may be symmetric or asymmetric.

To enable user interaction with the computing device architecture 700, an input device 745 can represent any number of input mechanisms, such as a microphone for speech, a touch-sensitive screen for gesture or graphical input, keyboard, mouse, motion input, speech and so forth. An output device 735 can also be one or more of a number of output mechanisms known to those of skill in the art, such as a display, projector, television, speaker device. In some instances, multimodal computing devices can enable a user to provide multiple types of input to communicate with the computing device architecture 700. The communication interface 740 can generally govern and manage the user input and computing device output. There is no restriction on operating on any particular hardware arrangement and therefore the basic features here may easily be substituted for improved hardware or firmware arrangements as they are developed.

Storage device 730 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 725, read only memory (ROM) 720, and hybrids thereof. The storage device 730 can include service 732, service 734, and service 736 for controlling the processor 710. Other hardware or software modules are contemplated. The storage device 730 can be connected to the computing device connection 705. In one aspect, a hardware module that performs a particular function can include the software component stored in a computer-readable medium in connection with the necessary hardware components, such as the processor 710, connection 705, output device 735, and so forth, to carry out the function.

The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Specific details are provided in the description above to provide a thorough understanding of the embodiments and examples provided herein. However, it will be understood by one of ordinary skill in the art that the embodiments may be practiced without these specific details. For clarity of explanation, in some instances the present technology may be presented as including individual functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Individual embodiments may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general purpose computer, special purpose computer, or a processing device to perform a certain function or group of functions. Portions of computer resources used can be accessible over a network. The computer executable instructions may be, for example, binaries, intermediate format instructions such as assembly language, firmware, source code. Examples of computer-readable media that may be used to store instructions, information used, and/or information created during methods according to described examples include magnetic or optical disks, flash memory, USB devices provided with non-volatile memory, networked storage devices, and so on.

Devices implementing processes and methods according to these disclosures can include hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Typical examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific embodiments thereof, but those skilled in the art will recognize that the application is not limited thereto. Thus, while illustrative embodiments of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, embodiments can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, or A and B and C. The language "at least one of" a set and/or "one or more" of a set does not limit the set to the items listed in the set. For example, claim language reciting "at least one of A and B" or "at least one of A or B" can mean A, B, or A and B, and can additionally include items not listed in the set of A and B.

The various illustrative logical blocks, modules, circuits, and algorithm steps described in connection with the examples disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods, algorithms, and/or operations described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein.

Illustrative examples of the disclosure include:

Aspect 1: A method comprising: determining a cost surface of a route-based project associated with a geographic area, the cost surface comprising a plurality of nodes, each node of the plurality of nodes comprising one or more cost values associated with a respective location within the geographic area and corresponding to the node; determining whether a memory cache has data of each neighbor node of a current node that is being processed to determine a least-cost path from a start node in the cost surface to an end node in the cost surface; obtaining, from the memory cache, the data of each neighbor node; for each particular neighbor node that is not a boundary node in the cost surface, determining a projected cost value of the particular neighbor node based on an accumulated cost value of the particular neighbor node and an additional cost value estimated based on a distance between the particular neighbor node and the end node; and based on the projected cost value of each particular neighbor node, determining the least-cost path from the start node to the end node.

Aspect 2: The method of Aspect 1, wherein determining whether the memory cache has the data of each neighbor node of the current node comprises: determining that the memory cache does not contain data of one or more neighbor nodes of the current node; sending, to a data store, a request for the data of the one or more neighbor nodes, the request comprising respective coordinates of each of the one or more neighbor nodes; receiving, from the data store, the data of the one or more neighbor nodes; and storing the data of the one or more neighbor nodes in the memory cache.

Aspect 3: The method of any of Aspects 1 to 2, further comprising: based on a determination that one or more neighbor nodes of the current node have not been processed, indicating that the current node is an open node being processed; adding a reference to the open node to a list of nodes having respective node data stored in the memory cache; obtaining, from a data store, data associated with the one or more neighbor nodes that have not been processed; and storing the data of the one or more neighbor nodes in the memory cache.

Aspect 4: The method of Aspect 3, wherein the list of nodes is stored in a data structure, and wherein nodes in the list of nodes are ranked according to respective cost values associated with the nodes.

Aspect 5: The method of any of Aspects 1 to 4, wherein the projected cost value of the particular neighbor node is determined based on a cost value of the particular neighbor node and a different accumulated cost of the current node.

Aspect 6: The method of Aspect 5, further comprising: based on a determination that the accumulated cost value of the particular neighbor node is smaller than a current accumulated cost value of the particular neighbor node, updating the current accumulated cost value of the particular neighbor node based on the accumulated cost value of the particular neighbor node; and setting the current node as a parent of the particular neighbor node.

Aspect 7: The method of Aspect 6, further comprising: based on a determination that the particular node is in a list of nodes having respective node data stored in the memory cache, updating the list of nodes to include the particular node with the updated current accumulated cost value.

Aspect 8: The method of Aspect 6, further comprising: based on a determination that the particular node is not in a list of nodes having respective node data stored in the memory cache, adding the particular node to the list of nodes.

Aspect 9: The method of any of Aspects 1 to 8, further comprising: determining the current node based on a list of nodes from the plurality of nodes, the current node comprising a node having a lowest cost value from a set of cost values associated with other nodes in the list of nodes; and prior to processing each neighbor node of the current node, determining whether the current node is the end node.

Aspect 10: The method of any of Aspects 1 to 9, further comprising, for each node in a list of nodes identifying those of the plurality of nodes having data stored in the memory cache: obtaining, from the memory cache, additional data of each additional neighbor node of a new current node selected from the list of nodes; for each additional neighbor node that is not the boundary node in the cost surface, determining an additional projected cost value of the additional neighbor node based on an additional accumulated cost value of the additional neighbor node and a different additional cost value estimated based on a different distance between the additional neighbor node and the end node; and wherein the least-cost path from the start node to the end node is determined further based on the additional projected cost value of each particular neighbor node.

Aspect 11: The method of any of Aspects 1 to 10, wherein the least-cost path is determined from a plurality of possible paths from the start node to the end node, and wherein the least-cost path is determined based on a total projected cost associated with the least-cost path.

Aspect 12: A system comprising: one or more processors; and at least one non-transitory computer-readable medium having stored thereon instructions that, when executed by the one or more processors, cause the one or more processors to: determine a cost surface of a route-based project associated with a geographic area, the cost surface comprising a plurality of nodes, each node of the plurality of nodes comprising one or more cost values associated with a respective location within the geographic area and corresponding to the node; determine whether a memory cache has data of each neighbor node of a current node that is being processed to determine a least-cost path from a start node in the cost surface to an end node in the cost surface; obtain, from the memory cache, the data of each neighbor node; for each particular neighbor node that is not a boundary node in the cost surface, determine a projected cost value of the particular neighbor node based on an accumulated cost value of the particular neighbor node and an additional cost value estimated based on a distance between the particular neighbor node and the end node; and based on the projected cost value of each particular neighbor node, determine the least-cost path from the start node to the end node.

Aspect 13: The system of Aspect 12, wherein determining whether the memory cache has the data of each neighbor node of the current node comprises: determining that the memory cache does not contain data of one or more neighbor nodes of the current node; sending, to a data store, a request for the data of the one or more neighbor nodes, the request comprising respective coordinates of each of the one or more neighbor nodes; receiving, from the data store, the data of the one or more neighbor nodes; and storing the data of the one or more neighbor nodes in the memory cache.

Aspect 14: The system of any of Aspects 12 to 13, the at least one non-transitory computer-readable medium comprising instructions that, when executed by the one or more processors, cause the one or more processors to: based on a determination that one or more neighbor nodes of the current node have not been processed, indicate that the current node is an open node being processed; add a reference to the open node to a list of nodes having respective node data stored in the memory cache; obtain, from a data store, data associated with the one or more neighbor nodes that have not been processed; and store the data of the one or more neighbor nodes in the memory cache.

Aspect 15: The system of Aspect 14, wherein the list of nodes is stored in a data structure, and wherein nodes in the list of nodes are ranked according to respective cost values associated with the nodes.

Aspect 16: The system of any of Aspects 12 to 15, wherein the projected cost value of the particular neighbor node is determined based on a cost value of the particular neighbor node and a different accumulated cost value of the current node.

Aspect 17: The system of Aspects 12 to 16, the at least one non-transitory computer-readable medium comprising instructions that, when executed by the one or more processors, cause the one or more processors to: based on a determination that the accumulated cost value of the particular neighbor node is smaller than a current accumulated cost value of the particular neighbor node, update the current accumulated cost value of the particular neighbor node based on the accumulated cost value of the particular neighbor node; and set the current node as a parent of the particular neighbor node.

Aspect 18: The system of Aspect 17, the at least one non-transitory computer-readable medium comprising instructions that, when executed by the one or more processors, cause the one or more processors to: based on a determination that the particular node is in a list of nodes having respective node data stored in the memory cache, update the list of nodes to include the particular node with the updated current accumulated cost value.

Aspect 19: The system of Aspect 17, the at least one non-transitory computer-readable medium comprising instructions that, when executed by the one or more processors, cause the one or more processors to: based on a determination that the particular node is not in a list of nodes having respective node data stored in the memory cache, add the particular node to the list of nodes.

Aspect 20: The system of any of Aspects 12 to 19, the at least one non-transitory computer-readable medium comprising instructions that, when executed by the one or more processors, cause the one or more processors to: determine the current node based on a list of nodes from the plurality of nodes, the current node comprising a node having a lowest cost value from a set of cost values associated with other nodes in the list of nodes; prior to processing each neighbor node of the current node, determine whether the current node is the end node.

Aspect 21: The system of any of Aspects 12 to 20, the at least one non-transitory computer-readable medium comprising instructions that, when executed by the one or more processors, cause the one or more processors to, for each node in a list of nodes identifying those of the plurality of nodes having data stored in the memory cache: obtain, from the memory cache, additional data of each additional neighbor node of a new current node selected from the list of nodes; for each additional neighbor node that is not the boundary node in the cost surface, determine an additional projected cost value of the additional neighbor node based on an additional accumulated cost value of the additional neighbor node and a different additional cost value estimated based on a different distance between the additional neighbor node and the end node; and wherein the least-cost path from the start node to the end node is determined further based on the additional projected cost value of each particular neighbor node.

Aspect 22: The system of any of Aspects 12 to 21, wherein the least-cost path is determined from a plurality of possible paths from the start node to the end node, and wherein the least-cost path is determined based on a total projected cost associated with the least-cost path.

Aspect 23: A non-transitory computer-readable medium having stored thereon instructions that, when executed by one or more processors, cause the one or more processors to perform a method according to any of Aspects 12 to 22.

Aspect 24: A system comprising means for performing a method according to any of Aspects 12 to 22.

What is claimed is:

1. A method comprising:
   determining a cost surface of a route-based project associated with a geographic area, the cost surface comprising a plurality of nodes, each particular node of the plurality of nodes comprising one or more cost values associated with a respective location within the geographic area and corresponding to that particular node;
   determining whether a memory cache has data of each neighbor node of a current node that is being processed to determine a least-cost path from a start node in the cost surface to an end node in the cost surface;
   determining that the memory cache is missing data of one or more neighbor nodes of the current node;
   in response to determining that the memory cache is missing data of one or more neighbor nodes of the current node, retrieving the data of the one or more neighbor nodes from a data store and storing the data of the one or more neighbor nodes in the memory cache, the data of the one or more neighbor nodes being retrieved via a query comprising respective coordinates of the one or more neighbor nodes;
   obtaining, from the memory cache, the data of each neighbor node;
   for each particular neighbor node that is not a boundary node in the cost surface, determining a projected cost value of the particular neighbor node based on an accumulated cost value of the particular neighbor node and an additional cost value estimated based on a distance between the particular neighbor node and the end node; and
   based on the projected cost value of each particular neighbor node, determining the least-cost path from the start node to the end node.

2. The method of claim 1, further comprising:
   determining that the memory cache does not contain the data of the one or more neighbor nodes of the current node;
   sending, to the data store, the query for the data of the one or more neighbor nodes;
   receiving, from the data store, the data of the one or more neighbor nodes; and
   storing the data of the one or more neighbor nodes in the memory cache.

3. The method of claim 2, wherein the query further requests additional data of one or more additional nodes associated with a set of coordinates having a threshold proximity to the respective coordinates of the one or more neighbor nodes, and wherein the query further comprises one or more parameters identifying at least one of a size and a shape of a geometry associated with the one or more neighbor nodes and the one or more additional nodes, the method further comprising storing the additional data in the memory cache.

4. The method of claim 3, further comprising:
   prior to determining the projected cost value of each particular neighbor node, verifying that the memory cache has the data of each neighbor node of the current node; and
   prior to processing a new current node associated with the cost surface, verifying that each neighbor node of the current node has been processed.

5. The method of claim 1, further comprising:
   based on a determination that at least one neighbor node of the current node has not been processed, indicating that the current node is an open node being processed;
   adding a reference to the open node to a list of nodes having respective node data stored in the memory cache, wherein the list of nodes is stored in a data structure;
   obtaining, from the data store, data associated with the at least one neighbor node that has not been processed; and
   storing the data of the at least one neighbor node in the memory cache.

6. The method of claim 1, wherein the projected cost value of the particular neighbor node is determined based on a cost value of the particular neighbor node and a different accumulated cost value of the current node, the method further comprising:
   based on a determination that the accumulated cost value of the particular neighbor node is smaller than a current accumulated cost value of the particular neighbor node, updating the current accumulated cost value of the particular neighbor node based on the accumulated cost value of the particular neighbor node; and
   setting the current node as a parent of the particular neighbor node.

7. The method of claim 6, further comprising:
   based on a determination that the particular neighbor node is in a list of nodes having respective node data stored in the memory cache, updating the list of nodes to include the particular neighbor node with the updated current accumulated cost value.

8. The method of claim 6, further comprising:
   based on a determination that the particular neighbor node is not in a list of nodes having respective node data stored in the memory cache, adding the particular neighbor node to the list of nodes.

9. The method of claim 1, further comprising:
   determining the current node based on a list of nodes from the plurality of nodes, the current node comprising a node having a lowest cost value from a set of cost values associated with other nodes in the list of nodes; and prior to processing each neighbor node of the current node, determining whether the current node is the end node.

10. The method of claim 1, further comprising, for each node in a list of nodes identifying those of the plurality of nodes having data stored in the memory cache:
   obtaining, from the memory cache, additional data of each additional neighbor node of a new current node selected from the list of nodes; and
   for each additional neighbor node that is not the boundary node in the cost surface, determining an additional projected cost value of the additional neighbor node based on an additional accumulated cost value of the additional neighbor node and a different additional cost value estimated based on a different distance between the additional neighbor node and the end node;
   wherein the least-cost path from the start node to the end node is determined further based on the additional projected cost value of each particular neighbor node.

11. The method of claim 1, wherein the data store is associated with a storage device and the memory cache is associated with a memory device that is separate from the storage device, wherein the least-cost path is determined from a plurality of possible paths from the start node to the end node, and wherein the least-cost path is determined based on a total projected cost associated with the least-cost path.

12. A system comprising:
   one or more processors; and
   at least one non-transitory computer-readable medium having stored thereon instructions that, when executed by the one or more processors, cause the one or more processors to:
      determine a cost surface of a route-based project associated with a geographic area, the cost surface comprising a plurality of nodes, each particular node of the plurality of nodes comprising one or more cost values associated with a respective location within the geographic area and corresponding to that particular node;
      determine whether a memory cache has data of each neighbor node of a current node that is being processed to determine a least-cost path from a start node in the cost surface to an end node in the cost surface;
      determine that the memory cache is missing data of one or more neighbor nodes of the current node;
      in response to determining that the memory cache is missing data of one or more neighbor nodes of the current node, retrieve the data of the one or more neighbor nodes from a data store and store the data of the one or more neighbor nodes in the memory cache, the data of the one or more neighbor nodes being retrieved via a query comprising respective coordinates of the one or more neighbor nodes;
      obtain, from the memory cache, the data of each neighbor node;
      for each particular neighbor node that is not a boundary node in the cost surface, determine a projected cost value of the particular neighbor node based on an accumulated cost value of the particular neighbor node and an additional cost value estimated based on a distance between the particular neighbor node and the end node; and
      based on the projected cost value of each particular neighbor node, determine the least-cost path from the start node to the end node.

13. The system of claim 12, wherein the at least one non-transitory computer-readable medium comprises instructions that, when executed by the one or more processors, cause the one or more processors to:
   determine that the memory cache does not contain the data of the one or more neighbor nodes of the current node;
   send, to the data store, the query for the data of the one or more neighbor nodes;
   receive, from the data store, the data of the one or more neighbor nodes; and
   store the data of the one or more neighbor nodes in the memory cache.

14. The system of claim 13, wherein the query further requests additional data of one or more additional nodes associated with a set of coordinates having a threshold proximity to the respective coordinates of the one or more neighbor nodes, and wherein the query further comprises one or more parameters identifying at least one of a size and a shape of a geometry associated with the one or more neighbor nodes and the one or more additional nodes, the at least one non-transitory computer-readable medium comprises instructions that, when executed by the one or more processors, cause the one or more processors to store the additional data in the memory cache.

15. The system of claim 14, the at least one non-transitory computer-readable medium comprises instructions that, when executed by the one or more processors, cause the one or more processors to:
   prior to determining the projected cost value of each particular neighbor node, verify that the memory cache has the data of each neighbor node of the current node; and
   prior to processing a new current node associated with the cost surface, verify that each neighbor node of the current node has been processed.

16. The system of claim 12, wherein the at least one non-transitory computer-readable medium comprises instructions that, when executed by the one or more processors, cause the one or more processors to:
   based on a determination that one or more neighbor nodes of the current node have not been processed, indicate that the current node is an open node being processed;
   add a reference to the open node to a list of nodes having respective node data stored in the memory cache, wherein the list of nodes is stored in a data structure;
   obtain, from a data store, data associated with the one or more neighbor nodes that have not been processed; and
   store the data of the one or more neighbor nodes in the memory cache.

17. The system of claim 12, wherein the projected cost value of the particular neighbor node is determined based on a cost value of the particular neighbor node and a different accumulated cost value of the current node, and wherein the at least one non-transitory computer-readable medium comprises instructions that, when executed by the one or more processors, cause the one or more processors to:
   update, based on a determination that the accumulated cost value of the particular neighbor node is smaller than a current accumulated cost value of the particular neighbor node, the current accumulated cost value of the particular neighbor node based on the accumulated cost value of the particular neighbor node;
   set the current node as a parent of the particular neighbor node; and
   update, based on a determination that the particular neighbor node is in a list of nodes having respective node data stored in the memory cache, the list of nodes to include the particular neighbor node with the updated current accumulated cost value.

18. The system of claim 12, wherein the at least one non-transitory computer-readable medium comprises instructions that, when executed by the one or more processors, cause the one or more processors to:
   determine the current node based on a list of nodes from the plurality of nodes, the current node comprising a node having a lowest cost value from a set of cost values associated with other nodes in the list of nodes;
   prior to processing each neighbor node of the current node, determine whether the current node is the end node; and
   for each node in a list of nodes identifying those of the plurality of nodes having data stored in the memory cache:
      obtain, from the memory cache, additional data of each additional neighbor node of a new current node selected from the list of nodes; and
      for each additional neighbor node that is not the boundary node in the cost surface, determine an additional projected cost value of the additional neighbor node based on an additional accumulated cost value of the additional neighbor node and a different additional cost value estimated based on a different distance between the additional neighbor node and the end node;
   wherein the least-cost path from the start node to the end node is determined further based on the additional projected cost value of each particular neighbor node.

19. A non-transitory computer-readable medium having stored thereon instructions which, when executed by one or more processors, cause the one or more processors to:
   determine a cost surface of a route-based project associated with a geographic area, the cost surface comprising a plurality of nodes, each particular node of the plurality of nodes comprising one or more cost values associated with a respective location within the geographic area and corresponding to that particular node;
   determine whether a memory cache has data of each neighbor node of a current node that is being processed to determine a least-cost path from a start node in the cost surface to an end node in the cost surface;
   determine that the memory cache is missing data of one or more neighbor nodes of the current node;
   in response to determining that the memory cache is missing data of one or more neighbor nodes of the current node, retrieving the data of the one or more neighbor nodes from a data store and storing the data of the one or more neighbor nodes in the memory cache, the data of the one or more neighbor nodes being retrieved via a query comprising respective coordinates of the one or more neighbor nodes;
   obtain, from the memory cache, the data of each neighbor node;
   for each particular neighbor node that is not a boundary node in the cost surface, determine a projected cost value of the particular neighbor node based on an accumulated cost value of the particular neighbor node and an additional cost value estimated based on a distance between the particular neighbor node and the end node; and
   based on the projected cost value of each particular neighbor node, determine the least-cost path from the start node to the end node.

20. The non-transitory computer-readable medium of claim 19, wherein determining whether the memory cache has the data of each neighbor node of the current node comprises:
   determining that the memory cache does not contain data of one or more neighbor nodes of the current node;
   sending, to a data store, the query for the data of the one or more neighbor nodes;
   receiving, from the data store, the data of the one or more neighbor nodes; and
   storing the data of the one or more neighbor nodes in the memory cache.

* * * * *